(12) United States Patent
Omori

(10) Patent No.: US 7,586,631 B2
(45) Date of Patent: Sep. 8, 2009

(54) IMAGE QUALITY CORRECTION METHOD, IMAGE DATA PROCESSING DEVICE, DATA STORING/REPRODUCING METHOD, DATA BATCH-PROCESSING SYSTEM, DATA PROCESSING METHOD, AND DATA PROCESSING SYSTEM

(75) Inventor: Shiro Omori, Tokyo (JP)

(73) Assignee: Sony Corporation (JP)

( * ) Notice: Subject to any disclaimer, the term of this patent is extended or adjusted under 35 U.S.C. 154(b) by 748 days.

(21) Appl. No.: 10/149,005

(22) PCT Filed: Oct. 4, 2001

(86) PCT No.: PCT/JP01/08763

§ 371 (c)(1),
(2), (4) Date: Sep. 4, 2002

(87) PCT Pub. No.: WO02/32112

PCT Pub. Date: Apr. 18, 2002

(65) Prior Publication Data

US 2003/0059123 A1 Mar. 27, 2003

(30) Foreign Application Priority Data

| Oct. 6, 2000 | (JP) | ............................. 2000-308189 |
| Oct. 18, 2000 | (JP) | ............................. 2000-318083 |
| Feb. 1, 2001 | (JP) | ............................. 2001-025756 |
| Feb. 1, 2001 | (JP) | ............................. 2001-025757 |

(51) Int. Cl.
*G06F 3/12* (2006.01)

(52) U.S. Cl. ...................... 358/1.15; 358/518; 358/254; 382/167; 382/274; 709/201; 709/232

(58) Field of Classification Search ................ 358/1.15, 358/518; 382/254, 167, 274; 709/201, 232
See application file for complete search history.

(56) References Cited

U.S. PATENT DOCUMENTS 4,768,099 A 8/1988 Mukai et al.

(Continued)

FOREIGN PATENT DOCUMENTS

EP 0805418 11/1997

(Continued)

OTHER PUBLICATIONS

Supplementary European Search Report for corresponding application EP 01 97 4694; dated Nov. 22, 2006.

*Primary Examiner*—Twyler L Haskins
*Assistant Examiner*—Jacky X Zheng
(74) *Attorney, Agent, or Firm*—Lerner, David, Littenberg, Krumholz & Mentlik, LLP

(57) ABSTRACT

An object of the invention is to process image data the quality by simply uploading the image data prepared by the user himself himself to a server of a provider without using a particular hardware equipped with an image quality correction function, without the need of purchasing and using a software for correcting the image quality, and without caring about anything. In a system including personal computers 2a, 2b, 2c, - - - of the clients and a server 1 of a provider, when image data are uploaded to the server 1 of the provider from the personal computers 2a, 2b, 2c, - - - of the clients, the quality image of the image data is corrected by the server 1.

3 Claims, 21 Drawing Sheets

U.S. PATENT DOCUMENTS

| | | | |
|---|---|---|---|
| 4,821,121 A | | 4/1989 | Beaulier |
| 5,250,933 A | | 10/1993 | Beaudin et al. |
| 5,619,571 A | * | 4/1997 | Sandstrom et al. .......... 380/200 |
| 5,737,491 A | | 4/1998 | Allen et al. |
| 5,898,835 A | | 4/1999 | Truong |
| 6,115,818 A | | 9/2000 | Barton |
| 6,147,742 A | * | 11/2000 | Bell et al. ..................... 355/27 |
| 6,522,418 B2 | * | 2/2003 | Yokomizo et al. .......... 358/1.15 |
| 6,628,417 B1 | * | 9/2003 | Naito et al. ................ 358/1.15 |
| 6,775,023 B1 | * | 8/2004 | Fukunaga et al. .......... 358/1.15 |
| 6,778,684 B1 | * | 8/2004 | Bollman ..................... 382/112 |
| 6,876,382 B1 | * | 4/2005 | Sakamoto ................. 348/207.2 |
| 6,930,709 B1 | * | 8/2005 | Creamer et al. .......... 348/211.3 |
| 6,952,223 B2 | * | 10/2005 | Terashita ................. 348/222.1 |
| 6,967,742 B1 | * | 11/2005 | Nagashima ................. 358/1.9 |
| 6,983,415 B2 | * | 1/2006 | Shima ..................... 715/501.1 |
| 7,010,144 B1 | * | 3/2006 | Davis et al. ................. 382/100 |
| 7,145,690 B1 | * | 12/2006 | Yoshimura ................. 358/1.9 |
| 7,181,092 B2 | * | 2/2007 | Tsukioka ................... 382/312 |
| 2002/0057454 A1 | * | 5/2002 | Ueda et al. ................ 358/1.15 |

FOREIGN PATENT DOCUMENTS

| | | |
|---|---|---|
| EP | 0889636 | 1/1999 |
| EP | 889636 A2 * | 1/1999 |
| EP | 0991227 | 4/2000 |
| JP | 61-208577 | 9/1986 |
| JP | 63-073419 | 4/1988 |
| JP | 04-131921 | 5/1992 |
| JP | 06195427 | 12/1992 |
| JP | 06-314322 | 11/1994 |
| JP | 08202692 | 8/1996 |
| JP | 08-328789 | 12/1996 |
| JP | 09034772 | 2/1997 |
| JP | 09-102847 | 4/1997 |
| JP | 10-323325 | 12/1998 |
| JP | 11-066274 | 3/1999 |
| JP | 11-073488 | 3/1999 |
| JP | 11120127 | 4/1999 |
| JP | 11-239276 | 8/1999 |
| JP | 11212928 | 8/1999 |
| JP | 11-289454 | 10/1999 |
| JP | 11-298729 | 10/1999 |
| JP | 2000-098506 | 4/2000 |
| JP | 2000-099692 | 4/2000 |
| JP | 2000-149037 | 5/2000 |
| JP | 2001-177798 | 6/2001 |
| JP | 2001-274945 | 10/2001 |
| WO | WO-96/38982 | 12/1996 |
| WO | WO-00/55744 | 9/2000 |

* cited by examiner

FIG. 16

```
file001          2000.09.25.18:35:56
file004          2000.09.25.18:35:56
file005          2000.09.25.18:35:56
file006          2000.09.17.22:57:03
file007          2000.09.17.22:57:03
file009          2000.09.17.22:57:03
file010          2000.09.25.18:35:56
file012          2000.09.25.18:35:56
```

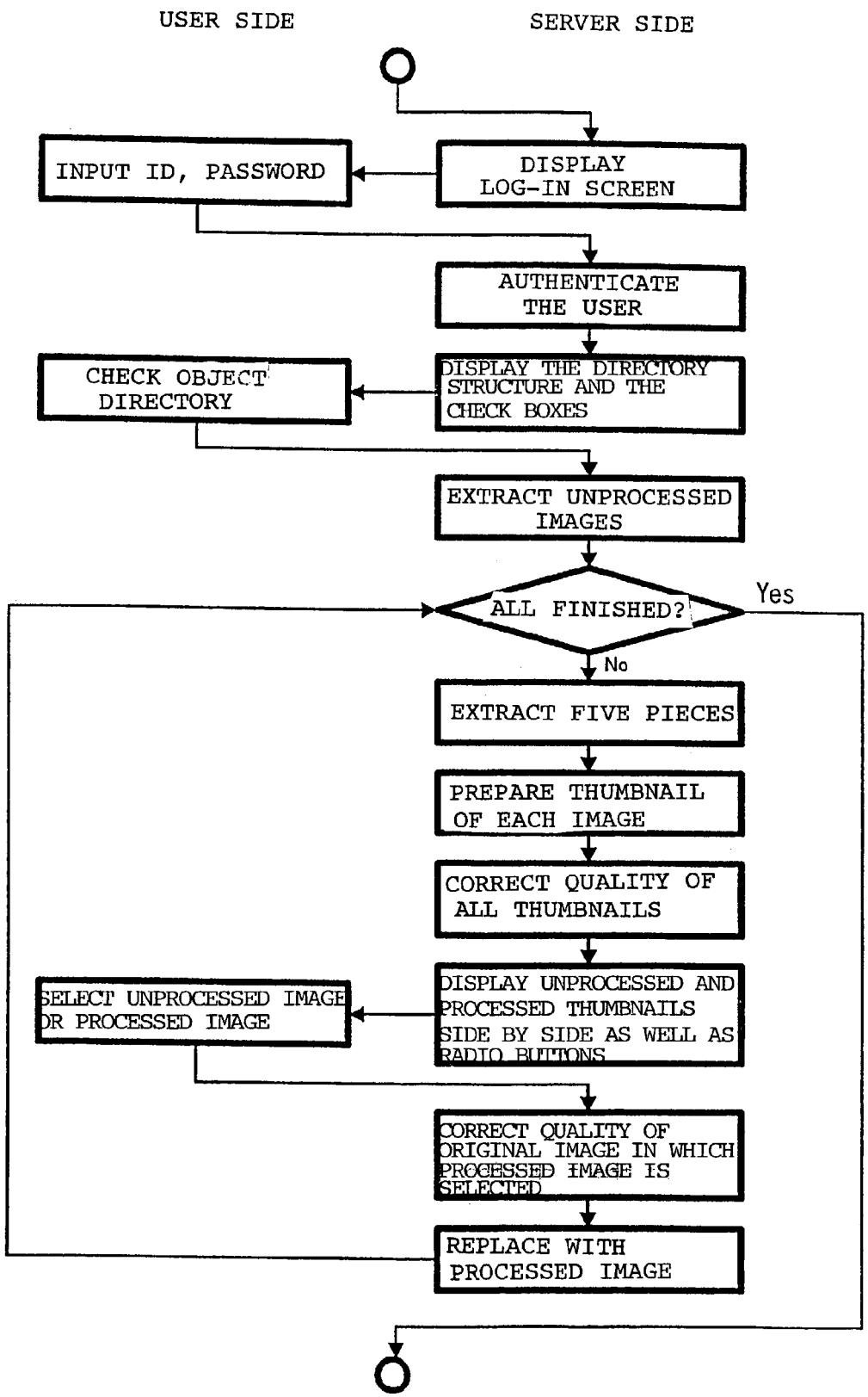

FIG. 23

| | | |
|---|---|---|
| BITMAP FILE HEADER | FILE ID | 2 BYTES |
| | FILE SIZE | 4 |
| | RESERVED 1 | 2 |
| | RESERVED 2 | 2 |
| | FILE HEADER SIZE | 4 |
| BITMAP INFO HEADER | INFO IMAGE SIZE | 4 |
| | WIDTH OF IMAGE | 4 |
| | HEIGHT OF IMAGE | 4 |
| | NUMBER OF PLANES | 2 |
| | BIT NUMBER PER PIXEL | 2 |
| | COMPRESSION SYSTEM | 4 |
| | IMAGE SIZE | 4 |
| | HZTL RESOLUTION | 4 |
| | VTCL RESOLUTION | 4 |
| | NUMBER OF COLORS | 4 |
| | IMPORTANCE NUMBER | 4 |
| PALLET DATA × NUMBER OF COLORS | BLUE | 1 |
| | GREEN | 1 |
| | RED | 1 |
| | RESERVED | 1 |
| PROCESSING RECORD INFORMATION | TEXT | VARIABLE |
| | COMMENT | VARIABLE |
| DATA | | |

FIG. 24

PQE-Contrast:1.04,Parameters:{Bright=0.98,Contrast=1.09},
Date:20001113185058,XXX;PQE-Color:2.11,Parameters:
{Red=0.99,Green=1.01,Blue=1.05},Date:20001031210501,XXX;

IMAGE QUALITY CORRECTION METHOD, IMAGE DATA PROCESSING DEVICE, DATA STORING/REPRODUCING METHOD, DATA BATCH-PROCESSING SYSTEM, DATA PROCESSING METHOD, AND DATA PROCESSING SYSTEM

TECHNICAL FIELD

The present invention relates to a method of correcting image of image quality data put on, for example, a web server of a provider of an internet and to an apparatus for processing the image data. The invention further relates to a method of storing/reproducing data by storing, for example, image data in a storage medium (web page) of a web server of the provider of the internet and reproducing the image data, and to such a system for batch processing the data. The invention further relates to a method of processing data by subjecting the data such as image data put, for example, on the web server of the provider of the internet to data processing such as image quality correction, and to such a system for processing the data.

BACKGROUND ART

The image data can, generally, be corrected for their quality in a hardware (e.g., electronic still camera) used for taking a picture or in a personal computer which has acquired the image data. It is because, the image quality can be corrected by a function of the hardware used for taking a picture or by a software installed in the personal computer.

When pictures are taken by using a silver salt camera, on the other hand, the user usually asks a DPE shop to develop and print the pictures. The DPE shop corrects the image quality, so that the user can receive the prints having their picture qualities almost properly corrected without the need user's caring about anything.

However, the user does not always take pictures using a hardware equipped with an image quality correction function or does not always use a personal computer in which a software for correcting the image quality is installed. For example, the user who has a plurality of digital still cameras may be forced to take pictures using a camera which is not equipped with a desired function. In such a case, the user is not allowed to enjoy the benefit of the image correction function of a high-functional digital still camera, as a matter of course. When the user desires to upload intactly the image data taken outdoors using a camera attached to a portable terminal onto the web server on the internet, he cannot utilize the software for image quality correction even though the software may be installed in the personal computer.

In general, further, irrespective of whether the image quality correction function is equipped in the hardware or is realized by the software, the user always cannot avoid the inconvenience of buying it at a considerable price. Besides, if the user forget to use the image quality correction function or cannot use the function to a sufficient degree, then, the function is not utilized to a sufficient degree.

On the other hand, when the image data acquired by a digital still camera are uploaded to a web server for appreciation, there is no room for the image quality correction unlike the one executed in the case of the silver salt photographs, and no correction is accomplished unless the user corrects the image quality by using the software or the like.

Accompanying the widespread use of internet in recent years, further, it is becoming more popular to preserve the image data and the like, possessed by the user on a web page of a web server of the provider through a network and to lay them open as a web page.

For example, the image data can be corrected for their quality by the hardware used at the for electric still camera for taking a picture or on a personal computer which has received the image data. This is done by the function mounted in the hardware or by processing a software installed in the personal computer.

However, the user does not always use the hardware equipped with the image quality correction function and does not, always user the personal computer in which the software for correcting the image quality is installed. For example, the user who has a plurality of digital still cameras may often be forced to shoot pictures using a camera which is not equipped with a desired function. In such a case, the user is not allowed to enjoy the benefit of the image correction function of a highly functional digital still camera, as a matter of course. When it is desired to upload the image data shot outdoors by using a camera attached to a portable terminal onto the web server on the internet, it is not allowed to utilize the software for image correction even though it may have been installed in the personal computer.

In general, further, irrespective of whether the image quality correction function is equipped in the hardware or is realized by the software, the user always cannot avoid the inconvenience of buying it at a considerable price. Besides, if the user forget to use the image quality correction function or cannot make goods use of the function, then the function is not enough utilized disadvantageously.

Further, when a new version featured by improved correction function comes onto the market, if this new version relates to a function which is based on the hardware, then, the user must buy the hardware again. Or, if the new version relates to a function of the software, the user must make the version up inconveniently.

In other words, to enjoy full benefit of the image quality correction function, the user must have an adequate knowledge, which may not be unsuitable for general users.

To solve this problem, the inventor processes such the one that a program for correcting the picture quality is put in the server and the user operates the program on the web from the client's personal computer or the like to correct the image data preserved in the server.

Among the systems for correcting the quality of the image data on the server, when the image data are managed as a file by an ordinary file system, it is difficult to completely decide whether the data file has already been corrected for the quality of the image data or has not yet been corrected. Repetition of the processing for correcting the quality of the same image data a plurality of times may often give no meaning or may give bad effect, which poses a problem. Therefore, means is necessary for judging whether or not the processing for correcting the quality of the image data has already been executed.

To solve the above problem, a method of separately providing a file for managing the data has already been proposed. This method is such that the put and name of the data file as well as whether the processing for correcting the quality of the image data has been executed are stored, and the file is rewritten every time when the processing is executed for correcting the quality of the image data.

According to the method of separately providing the file for managing the data, however, it is not easy for the user to cope with a change in the name of the data file on the server after the data has been processed. In other words, matching it has a drawback that not maintained between the file for managing the data and the real data file.

DISCLOSURE OF INVENTION

In view of the above-mentioned points, it is an object of the present invention is to make the processing for correcting the quality of image data to be performed by simply uploading the image data prepared by the user himself onto the server of a provider without using a particular hardware equipped with an image quality correction function, without the need of purchasing and using a software for correcting the image quality, and without caring about anything as in the case of the conventional silver salt photograph.

It is another object of the present invention to make it possible to obtain corrected image data on a web server without the need of using a particular hardware equipped with an image quality correction function, without the need of purchasing and using a software, without caring about the version-up, but by simply uploading the image data prepared by the user himself to the web server and by selecting a file that is desired to be corrected.

It is further another object of the present invention to make it easy for the user to cope with a change in the name or place of the data file in the server.

A method of correcting the image quality of the present invention is such that, in a system that includes a personal computer of a client and a server of a provider, when the image data are uploaded onto the server of the provider from the personal computer of the client, the quality of the image data is corrected by the server.

According to the present invention, the quality of the image data is corrected by simply uploading the image data prepared by the user himself who is the client onto the server of the provider. Therefore, almost appropriate image data can be put on a web page of the server while the user carries about nothing.

The present invention further provides an apparatus for processing image data uploaded to a server of a provider from a personal computer of a client, comprising:

image data-acquisition means for acquiring image data onto the server;

first storage means for storing the image data;

image quality correction means for correcting the quality of image data stored in the first storage means;

second storage means for storing the image data of which the quality has been corrected using the same identifier as that used before correcting the image quality; and management means for managing the correction of the image quality.

According to the present invention, when the image data prepared by the user himself who is the client are uploaded onto the server of the provider, the image quality correction means provided in the server corrects the quality of image data. Therefore, almost appropriate image data can be put on the web page of the server while the user carries about nothing.

The present invention provides with a method of correcting image quality of image data uploaded to a web of a provider from a personal computer of a client, wherein an intermediate server is provided between the personal computer of the client and the server of the provider, and when the personal computer of the client has specified the uploading onto the server of the provider using a dedicated program, the image data are corrected for their quality by the intermediate server and then uploaded to the server of the provider.

According to the above invention, when it is specified to upload the image data prepared by the user himself who is the client onto the server of the provider, the image data are corrected for their quality by the intermediate server and are, then, uploaded to the server of the provider. Therefore, almost appropriate image data can be put on the web page of the server while the user carries about nothing.

The invention further provides an apparatus for processing image data that are uploaded to a web of a server of a provider from a personal computer of a client, wherein an intermediate server is provided between the personal computer of the client and the server of the provider, the intermediate server including obtaining means for acquiring the image data and a destination to where the image data are to be uploaded, image quality correction means for correcting the quality of the image data, and management means for managing the correction of the image quality, and the server of the provider is provided with image data acquisition means for acquiring the image data and storage means for storing the image data that are acquired.

According to the above invention, when it is attempted to upload the image data prepared by the user himself who is the client onto the server of the provider, the image data are corrected for their quality by the image quality correction means in the intermediate server and are, then, uploaded onto the server of the provider. Therefore, almost appropriate image data can be put on the web page of the server while the user carries about nothing.

The present invention is further provides with a method of storing/reproducing data that includes storing data in a storage medium of a web server and reproducing the data therefrom, comprising the steps of:

storing data in the storage medium of the web server;

managing a file structure with the step of storing the data;

displaying a directory structure extracted with the step of management;

selecting a particular directory position indicated on the directory structure display;

converting the data for the data stored in the selected directory; and reproducing and outputting the converted data.

According to the above invention, the data such as image data stored in the storage medium of the web server are selected and are converted, e.g., for their image quality corrected. Therefore, the data such as image data that are converted or corrected for their image quality are obtained in the web server by simply uploading the data such as image data prepared by the user himself to the web server and selecting a file desired to effect the data conversion, e.g., for correcting the image quality correction, without using any particular hardware equipped with a function for correcting the image quality, without purchasing and handling the software, and without caring about the version-up.

The invention further provides with a method of processing data comprising the steps of:

processing the data; and writing the processing record information representing that the data have been processed into a portion managed together with the data.

According to the present invention, the information representing that the data have been processed are written into the portion managed integrally with the data. It is therefore easy to decide whether the data have been processed or not.

The invention also provides a system for processing data including a server on a network for preserving the data and an inspection equipment for on a network for inspecting the preserved data, further comprising:

data processing means for processing the data individually or collectively; and means for writing the processing record information representing that the data have been processed into a portion managed integrally with the data.

According to the present invention, the information representing that the data have been processed are written into the portion managed integrally with the data. It is therefore easy to decide whether the data have been processed.

The invention further provides a system for processing data including a server on a network that accepts the uploading of data, and a computer of a client on the network that unloads the data, further comprising:

uploading means for uploading the data;

data processing means for processing the data; and writing means for writing the processing record information representing that the data have been processed into a portion managed together with the data.

According to the present invention, the information representing that the data have been processed are written into the portion managed integrally with the data. It is therefore easy to decide whether the data have been processed or not.

BRIEF DESCRIPTION OF DRAWINGS

FIG. 16 is a diagram for explaining the present invention;

FIG. 22 is a flow chart for explaining the present invention;

FIG. 23 is a diagram for explaining the present invention; and

FIG. 24 is a diagram for explaining the present invention.

BEST MODE FOR CARRYING OUT THE INVENTION

Embodiments of a method of correcting image quality and of an apparatus for processing image data according the present invention will now be described with reference to the drawings.

Figure 2:
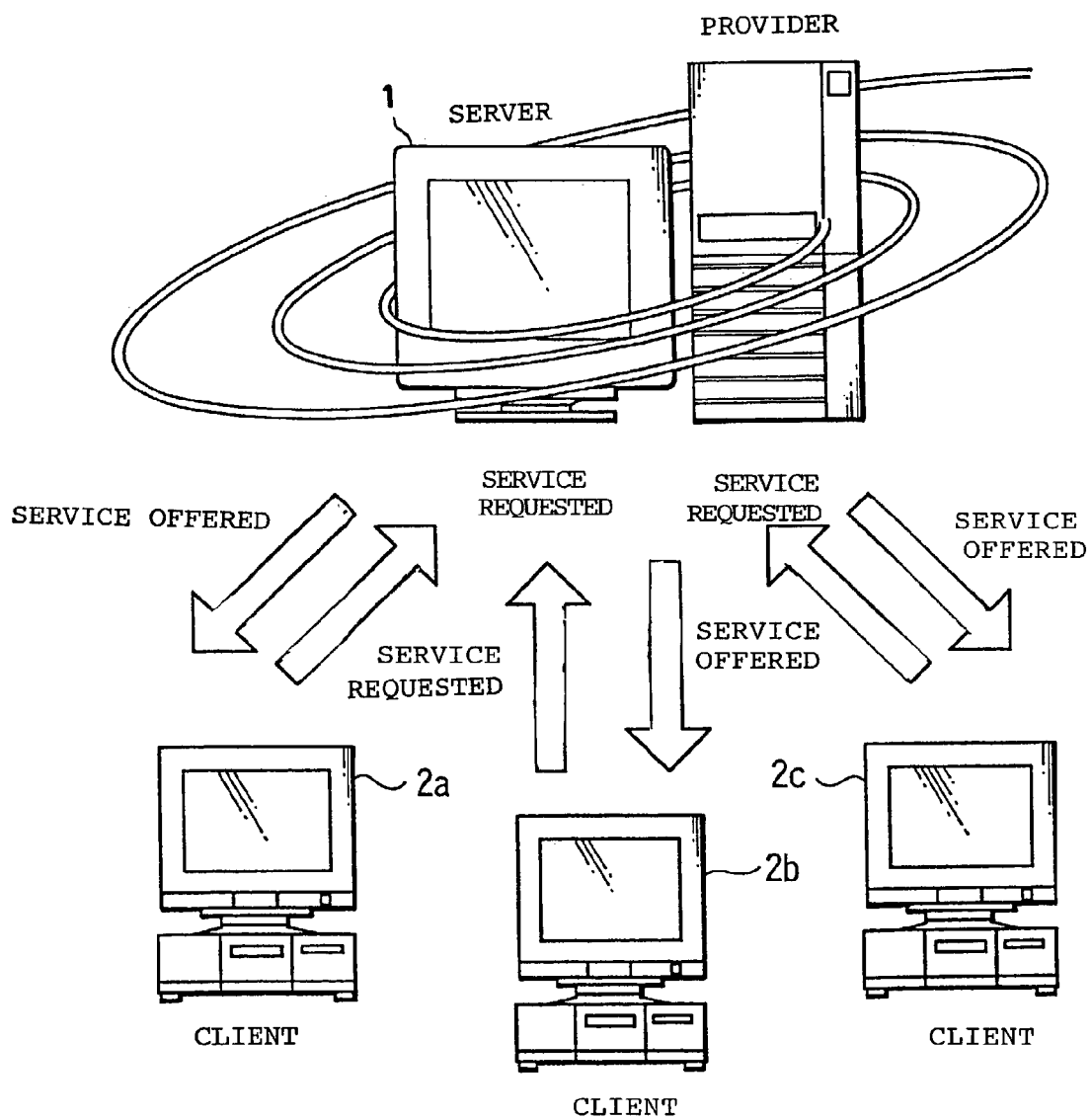
FIG. 2 is a diagram for explaining the present invention.

FIG. 2 illustrates the whole configuration of an apparatus for processing image data according to an embodiment, in which reference numeral 1 denotes a server of a provider, and reference numerals 2a, 2b, 2c, - - - denote personal computers of clients (users) that request service to the server 1, receive service from the server 1, and are connected to the server 1 through a communication circuit such as a public telephone circuit or a dedicated circuit.

The number of the personal computers 2a, 2b, 2c, - - - of the clients as viewed from the side of the server 1 is an arbitrary number set by a memory and the operational capability of a central processing unit (CPU) on the side of the server 1.

Figure 1:
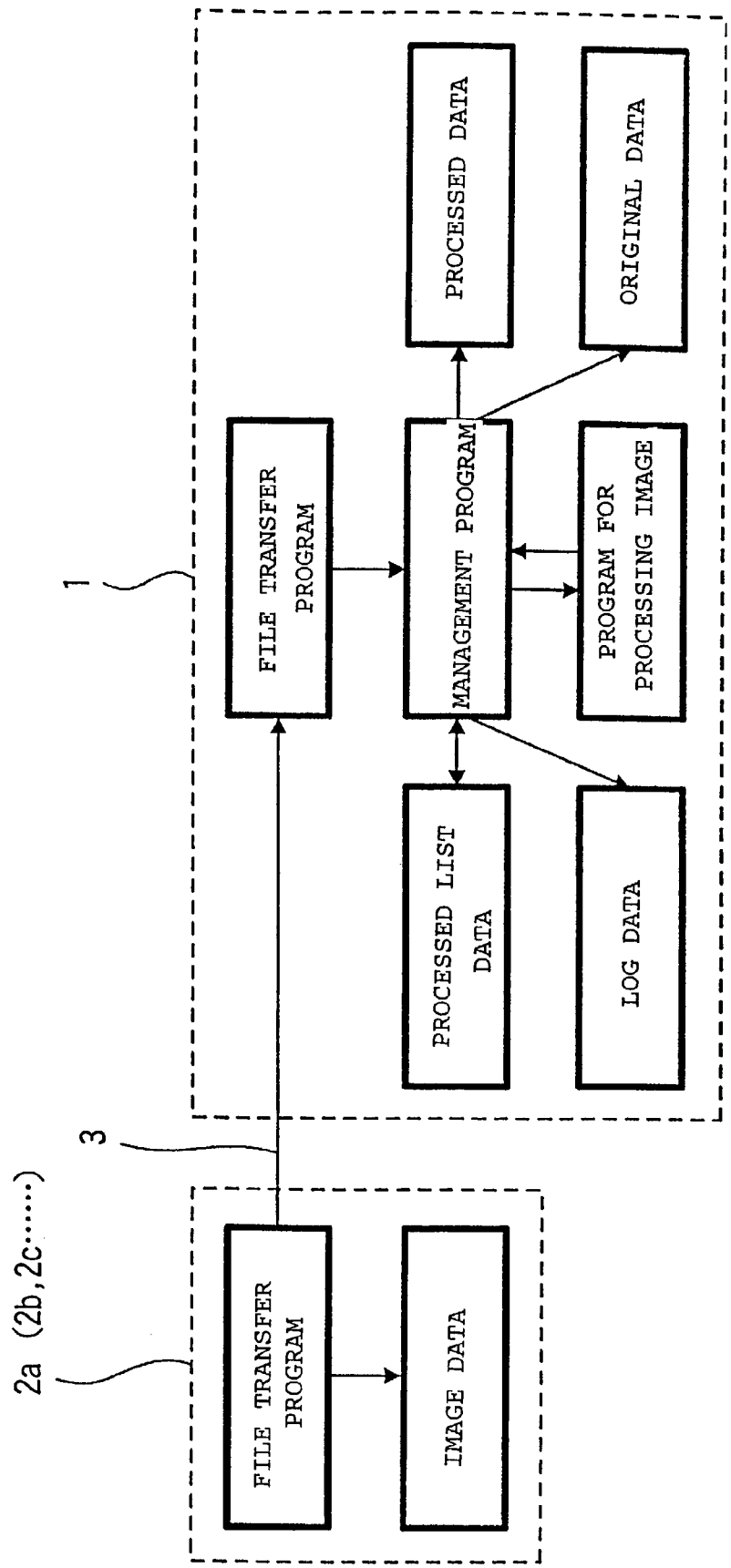
FIG. 1 is a diagram illustrating an embodiment of an apparatus for processing image data according to the present invention.

As is well known, each of the personal computers 2a, 2b, 2c, - - - of the clients includes a central processing unit (CPU) and a memory. In the memory as shown in FIG. 1, there is provided a file transfer program such as a browser program which is a software that operates on the basic operating system and is used for transferring image data. The personal computers 2a, 2b, 2c, - - - of the clients can arbitrarily activate the file transfer program to transfer (upload) the image data to the server 1 of the provider.

In such an example that the browser program is used by the personal computers 2a, 2b, 2c, - - - of the clients, a URL (uniform resource locator) of the server 1 of the provider is opened, and a picture corresponding to the description of a web page stored in the URL is shown on a display connected to or integrated with the client's personal computers 2a, 2b, 2c, - - - .

Figure 3:
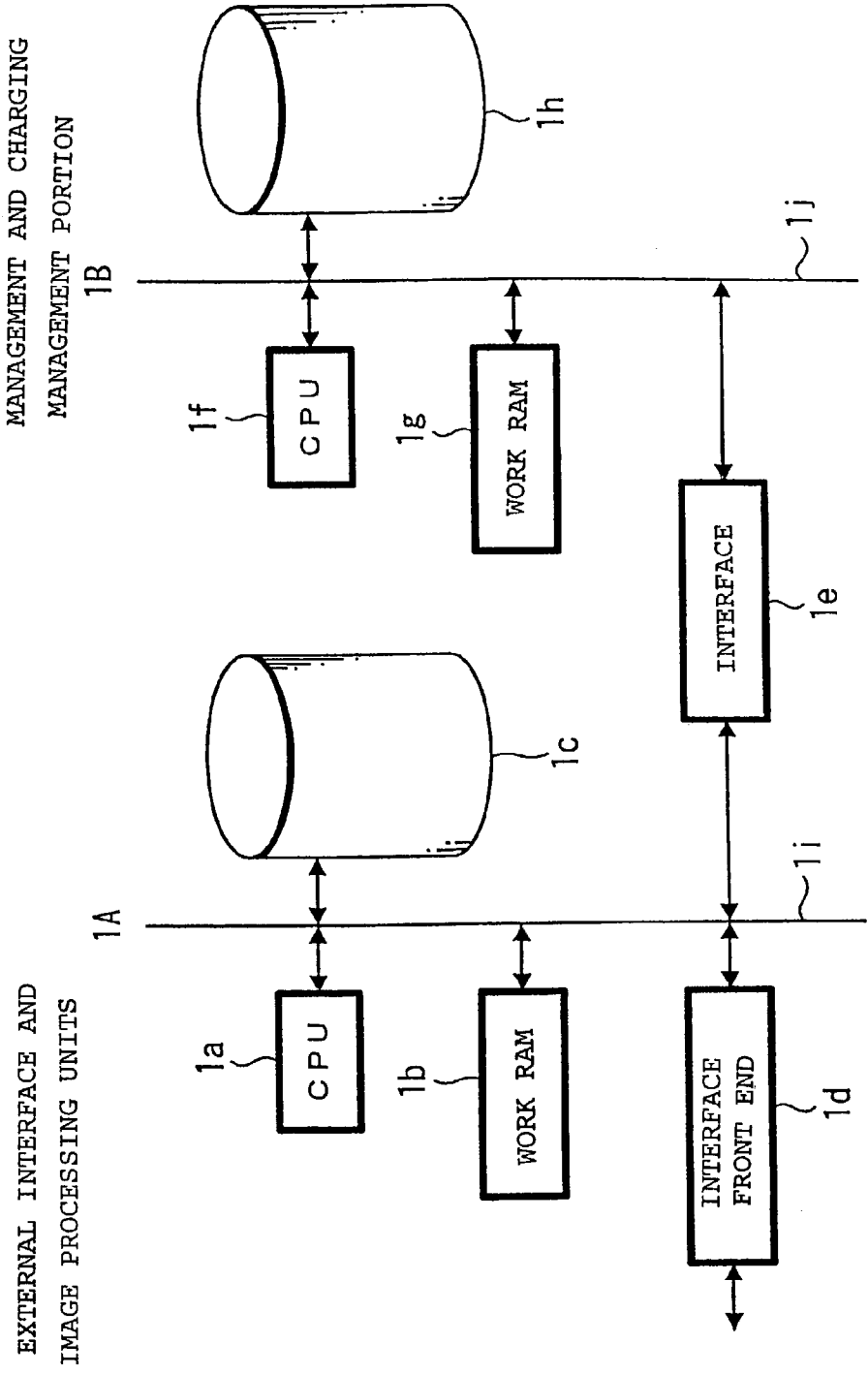
FIG. 3 is a structure diagram illustrating an example of the server.

Referring to FIGS. 1 and 3, the server 1 of the provider includes a central processing unit (CPU) 1a, a work RAM 1b and a memory 1c as is well known. Like those of the personal computers 2a, 2b, 2c, - - - of the clients, the operating system of the server 1 is provided with a file transfer program, an image processing program and a management program in the memory 1c, and activates these programs upon a request from any client (user).

The file transfer program of the server 1 of the provider is such that chiefly accepts the uploading of data from the client (user), and the image processing program is a service of this embodiment and corrects the quality of the image data.

The management program manages executing the correction of image quality. It receives, as a file, image data transferred (uploaded) from the client (user) and stores the image data in an original data storage area in the storage areas for the clients (users) (processed list data storage area, original data storage area, processed data storage area, and log data storage area) provided in the memory of the server 1.

The data transferred (uploaded) from the side of the personal computers 2a, 2b, 2c, - - - of the clients (users) include image data as well as auxiliary data related to image data. The auxiliary data are information on the image data, or inherent information assigned to, for example, an electronic still camera that has prepared the image data. When the inherent information and if the image data are based on the inherent information, is attached to the image data that are transferred (uploaded), the image processing program on the side of the server 1 of the provider executes an optimum image processing based on the inherent information.

The inherent information corresponding to the electronic still camera are selected when, for example, the browser software operating on the personal computers 2a, 2b, 2c, - - - of the clients reads the inherent information stored on the server 1 of the provider, displays them as a menu on the client's (user's) display screen, and selects the name of the electronic still camera used by the client (user).

In this case, by the file transfer program stored in the personal computers 2a, 2b, 2c, - - - and a program that is used for transferring the inherent information data, the file transfer program can select the name of the electronic still camera used by the client (user) on the display tubular screens of the personal computers 2a, 2b, 2c, - - - of the clients (users) just like the browser software, thus allowing the inherent information to be selected. By means of this, file transfer program, the inherent information can be transferred together with the image data.

In contrast to the case of using the inherent information, when the image processing program operating on the side of the server 1 has an optimizing routine of processing image for the image data, the inherent information need not be transferred.

The image data that are thus transferred (uploaded) are stored as processed data in the server 1 and registered in a processed data list after the image processing program is optimized by the inherent information or the optimum image processing optimizing routine.

Figure 4:
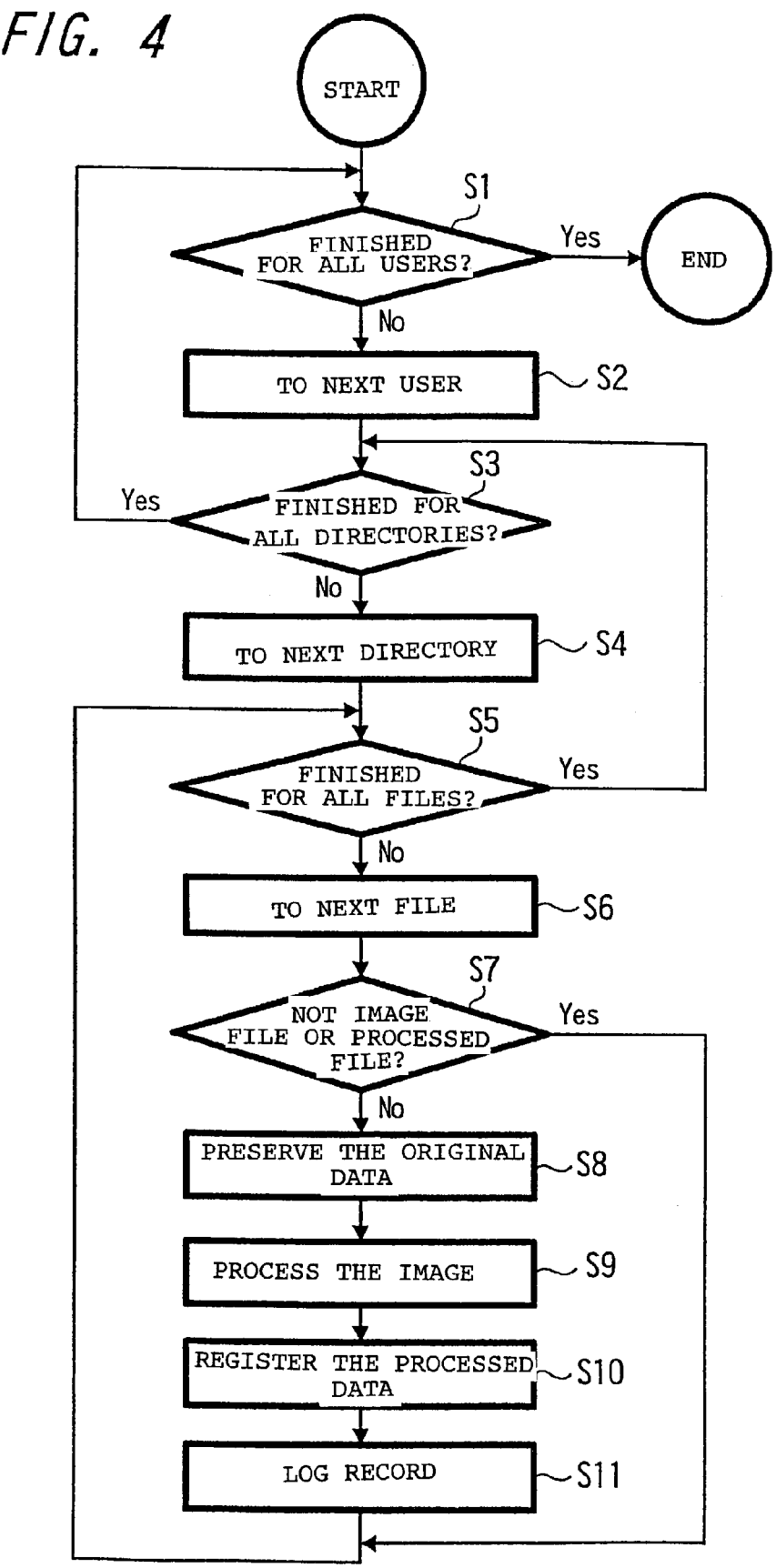
FIG. 4 is a flow chart for illustrating the present invention.

Correcting the quality of image data by the management program will be described in further detail using a flow chart of FIG. 4. It is decided whether the following processing has been finished for all clients (users)(step S1). When the processing has been finished, the routine ends. When the processing has not been finished, the processing is continued for the next client (user)(the first client in the first time)(step S2).

Next, it is decided if the following processing has been finished for all of the directories possessed by the client (user)(step S3). When the processing has been finished, the processing is shifted to the next client (user). When the processing has not been finished, the processing is continued for the next directory (the first directory in the first time)(step S4).

Next, it is decided whether the processing has been finished for the whole files in the directory (step S5). When the processing has been finished, the processing is shifted to the next directory. When the processing has not been finished, the processing is continued for the next file (the first file in the first time)(step S6).

It is decided whether the object file is an image file. When the object file is an image file, reference is made to the processed list data to decide whether the file has already been corrected for its image quality (step S7). When the object file is not the image file or is the image file that has already been processed, the file is not processed. When the image file has not yet been processed, a directory is prepared for preserving the original data by making the file the original data, e.g., as a sub-directory of the directory, and the file is moved to this place for preserving the original data (step S8).

Next, the image processing program is activated to correct the quality of the image data (step S9), and the processed data are produced and stored (step S10). In this case, the initial file name is maintained. The fact that the file has been processed has been recorded in the processed list data, and the fact that the processing has been executed is also recorded in the log data (step S11).

The above processings are executed for each of the files, for each of the directories and for each of the clients (users).

The timings for the management program to execute the above-mentioned processings are not limited to predetermined moments. For example, the processing may be executed for each of the files each time the uploading is sensed. In this case, the relevant client (user), relevant directory and relevant file need only be processed in the flow chart of FIG. 4, and there is no need of processing all clients (users), all directories and all files at one time. The processing may be executed not for each of the files but for each of the directories or for each of the clients (users), as a matter of course.

The order of processing is not limited to the one described above. The order may be replaced, or the processings may not be successively executed but may be executed in parallel without departing from the scope of invention described above. Instead of using the software on the computer for the server used for realizing the service, there may be provided a dedicated device having the same function. Depending on the function of the server 1, further, the same contents as those of the above-mentioned system may be divided into a plurality of servers to be executed.

To simplify the description in the foregoing, the correction was performed for all data. However, the object of correction may be limited to each of the clients (users), each of the directories, etc. In this case, the object is limited in advance, or a step is provided for clearly specifying the object at the time of uploading. The management program need only identify this, and need not perform the correction for those objects that are not to be corrected.

The management program further manages the accounting of the clients (users) in response to the request of log-in from the personal computers 2a, 2b, 2c, - - - of the clients (users), and executes charging for processing of the request from the clients (users).

Referring to FIG. 3, the configuration on the side of the server 1 of the provider is such that an charging information management portion is put on a processing block different from the service area for the client (user) to handle the charging information. Specifically, the server 1 of the provider includes a first block 1A comprising an interface front end 1d connected to the personal computers 2a, 2b, 2c, - - - of the clients (users), and image processing units 1a, 1b, 1c and a second block 1B comprising a management and charging management portion. The first block 1A and the second block 1B operate while authenticating each other through an interface 1e.

The second block 1B comprising the management and charging management portion includes a central processing unit (CPU) 1f, a work RAM 1g and a memory 1h. Reference numerals 1i and 1j denote bus lines.

The charging management is executed for such processings as image processing, inspection of image information and uploading of image.

This embodiment is configured as described above and so, when the client (user) unloads the image data to any directory in the server 1 of the provider in same way as before, the conventional manner, the management program in the server 1 executes the processing for correcting the image quality at a predetermined time, whereby the image data that are uploaded are corrected for their quality.

Thus, the image data in the server 1 of the provider are corrected for their quality. Then, when the user or a third party inspects the image data on the web page of the server 1 of the provider through the personal computer 2a, 2b, 2c, - - - of the client (user) using the browser, he can see the image data that have been corrected for their quality.

According to this embodiment, therefore, the client (user) can obtain image data that have been corrected for their quality on the web page of the server 1 without using a particular hardware electronic still camera) equipped with a function for correcting the image quality, without the need of purchasing and using an expensive software for correcting the image quality, but by simply uploading the image data prepared by the client (user) himself to the server 1 of the provider without caring about anything as in the case of silver salt photographs.

Further, since the client (user) need only care about uploading the image data onto the server 1 but need not care about where and how the picture quality is corrected, the client (user) feels no bother concerning the correction of picture quality.

A method of correcting image quality and an apparatus for processing image data according to another embodiment of the present invention will be described below with reference to the drawings.

Figure 6:
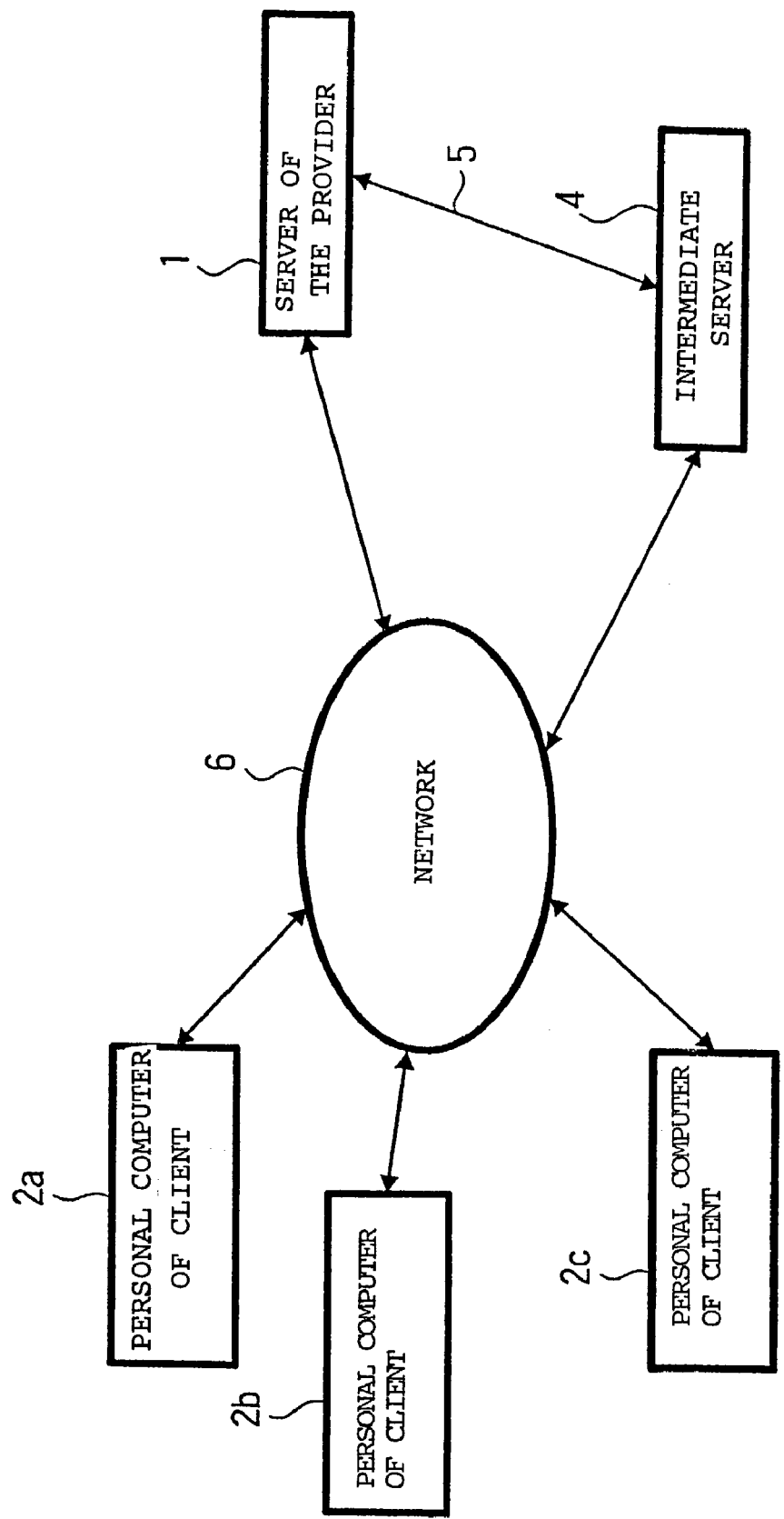
FIG. 6 is a diagram for explaining the present invention.

FIG. 6 illustrates the whole configuration of the apparatus for processing image data according to the embodiment, in which reference numeral 1 denotes a server of the provider, and reference numerals 2*a*, 2*b*, 2*c*, - - - denote personal computers of the clients (users) that request service to the server 1 of the provider, receive service from the server 1, and are connected to the server 1 through a network 6 such as a communication circuit like a public telephone circuit or a dedicated circuit.

In this embodiment, an intermediate server 4 is connected with the network 6. The intermediate server 4 is connected to the server 1 of the provider through the network 6 and otherwise is connected to the server 1 through a dedicated circuit 5 separated away from the network 6.

The number of the personal computers 2*a*, 2*b*, 2*c*, - - - of the clients as viewed from the side of the server 1 of the provider and from the intermediate server 4 is an arbitrary number set by memories and the capability of operation of the central processing unit (CPU) on the side of the server 1 the provider and the intermediate server 4.

Figure 5:
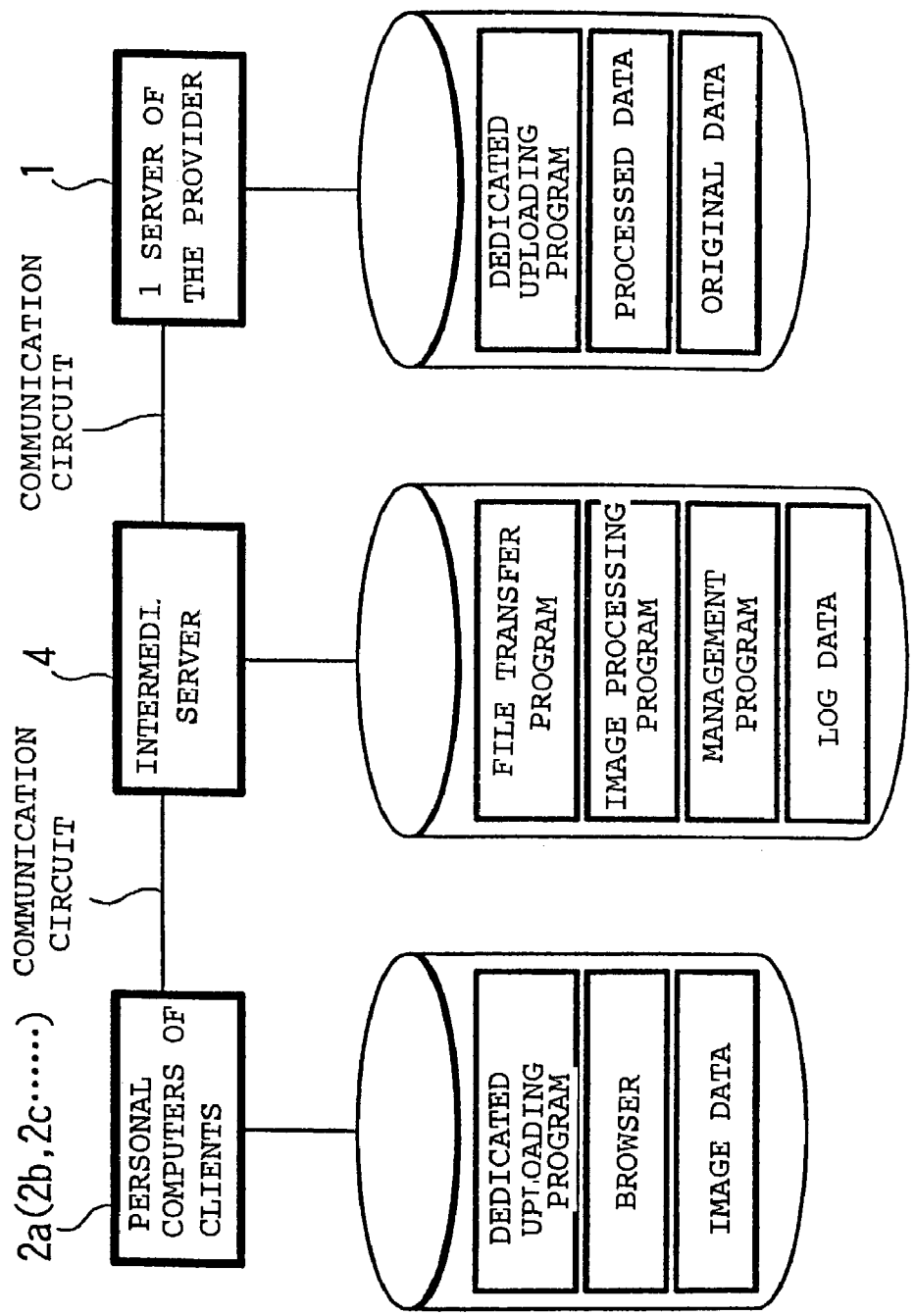
FIG. 5 is a diagram illustrating another embodiment of the apparatus for processing image data according to the present invention.

As is well known, each of the personal computers 2*a*, 2*b*, 2*c*, - - - of the clients includes a central processing unit (CPU) and a memory. In the memory as shown in FIG. 5, there is prepared a file transfer program such as the browser program which operates on the basic operating system. In this embodiment, a dedicated uploading program is further prepared. The dedicated uploading program is used when a client (user) is going to upload the image data to the server 1 of the provider.

In this embodiment, the browser program is chiefly used for inspecting the data on the server 1 of the provider. In such an example that the browser program is used by the personal computers 2*a*, 2*b*, 2*c*, - - - of the clients (users), a URL (uniform resource locator) of the server 1 of the provider is opened, and a picture corresponding to the description of a web page stored in the URL shown on a display connected to or integrated with the client's (user's) personal computers 2*a*, 2*b*, 2*c*, - - -.

The dedicated uploading program (of the personal computers 2*a*, 2*b*, 2*c*, - - - of the clients (users) transfers (unloads) the image data to the intermediate server 4 and together therewith sends instructions to transfer (upload) to the server 1 of the provider. In this case, the above-mentioned instructions can be eliminated when the intermediate server 4 and the server 1 of the provider are connected to each other through the dedicated circuit 5 and when the servers 4 and 1 are set so as to successively process the image data.

Figure 7:
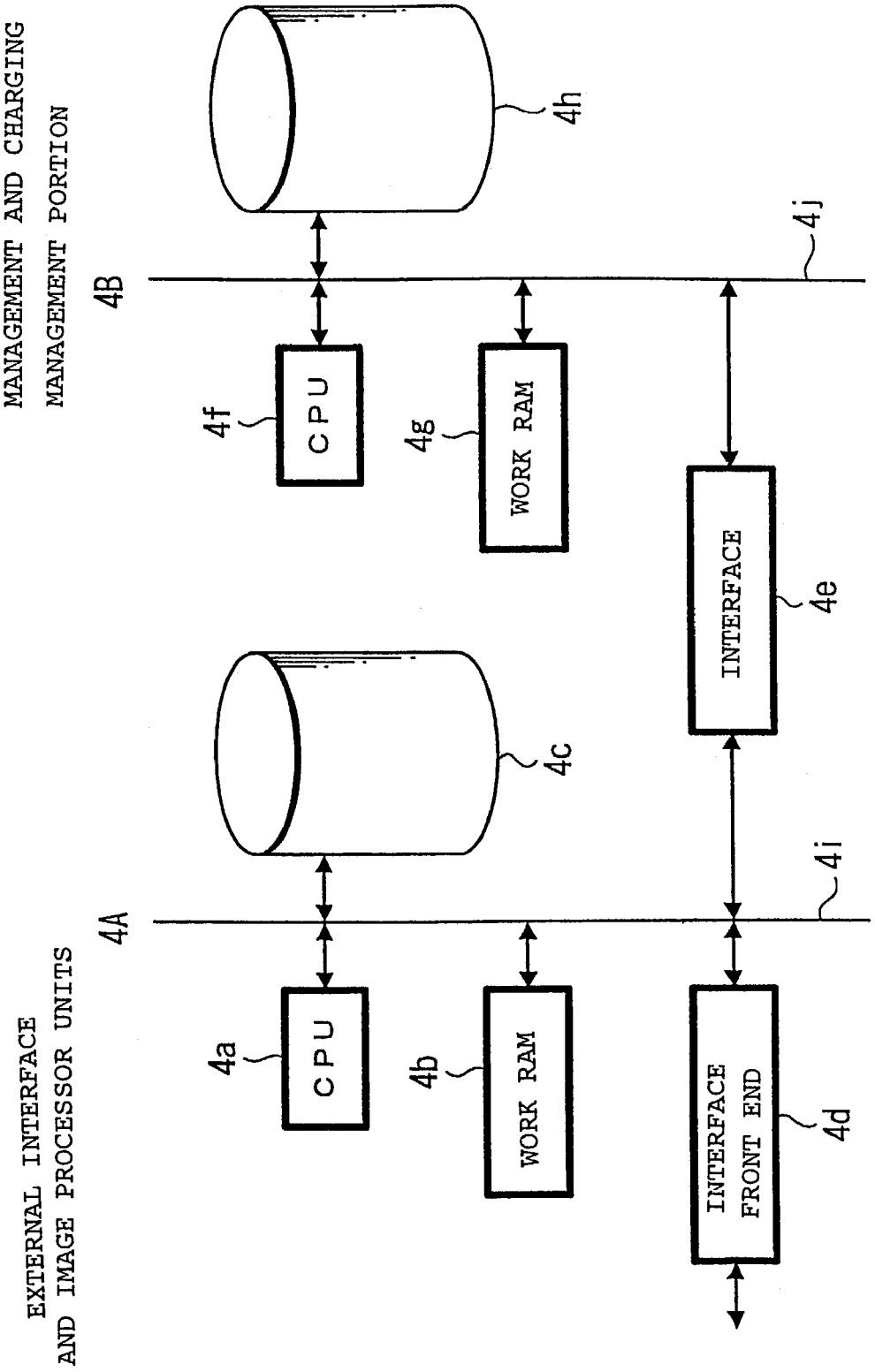
FIG. 7 is a structure diagram for illustrating an example of the intermediate server.

Referring to FIGS. 5 and 7, the intermediate server 4 includes a central processing unit (CPU) 4*a*, a work RAM 4*b* and a memory 4*c* as is well known. Like those of the personal computers 2*a*, 2*b*, 2*c*, - - - of the clients, the operating system of the intermediate server 4 is provided with a file transfer program, an image processing program and a management program in the memory 4*c*, and activates these programs upon a request from any client (user).

The file transfer program of the intermediate server 4 is chiefly accepts the uploading of image data from the client (user) and transfers the image data after being corrected for their image quality to a predetermined position of the server 1 of the provider. The image processing program manages service of this embodiment and corrects the quality of the image data. The management program manages executing the correction of image quality. In this case, the record of operation of the system is saved as log data.

The data transferred (uploaded) from the side of the personal computers 2*a*, 2*b*, 2*c*, - - - of the clients (users) include image data as well as auxiliary data related to the image data. The auxiliary data are information on the image data and inherent information or photographing conditions assigned to, for example, an electronic still camera that has prepared the image data. When the inherent information is attached to the image data that transferred (uploaded), the image processing program on the side of the intermediate server 4 executes an optimum image processing based on the inherent information.

The inherent information is directly recorded in the image file by, for example, the electronic still camera. When pictures are taken by an electronic still camera without such a function, the browser software that operates on the personal computers 2*a*, 2*b*, 2*c*, - - - of the clients reads out the inherent information stored on the intermediate server 4, displays them as a menu on the client's (user's) display screen, and selects the name of the electronic still camera used by the client (user), so that the inherent information corresponding to the electronic still camera can be selected.

In this case, by the dedicated uploading program stored in the personal computers 2*a*, 2*b*, 2*c*, - - - and the program that is used for transferring the inherent information, the file transfer program can select the name of the electronic still camera used by the client (user) on the display screens of the personal computers 2*a*, 2*b*, 2*c*, - - - of the clients (users) just like the browser software, and thus can select the inherent information. The dedicated uploading program allows the inherent information to be transferred together with the image data.

In contrast to the case of using the inherent information, when the image processing program operating on the side of the intermediate server 4 has an optimizing routine for processing the image data, the inherent information need not be transferred.

The image data thus transferred (uploaded) are processed by the image processing program optimized using the inherent information or the image processing optimizing routine, transferred to the server 1 as processed data, and are stored and registered in the processed list.

As shown in FIGS. 5 and 3, the server 1 of the provider includes the central processing unit (CPU) 1*a*, work RAM 1*b* and memory 1*c* as is well known, the memory 1*c* being provided with the file transfer program. The file transfer program accepts the uploading of data from the personal computers 2*a*, 2*b*, 2*c*, - - - of the clients (users) or from the intermediate server 4.

The processed image data of which the quality is corrected by the intermediate server 4 are stored in the processed data storage area of the storage area for the clients (users) provided in the memory 1*c* of the server 1 of the provider, and the image data uploaded by the client (user) but whose quality has not been corrected are stored in the original data storage area for the clients (users) in the memory 1*c*.

Operation of the personal computers 2*a*, 2*b*, 2*c*, - - - of the clients (users) will now be described in further detail with reference to a flow chart of FIG. 8. The clients (users) who wish to upload the image data activate the dedicated uploading program of the personal computers 2a, 2b, 2c, - - - .

Figure 8:
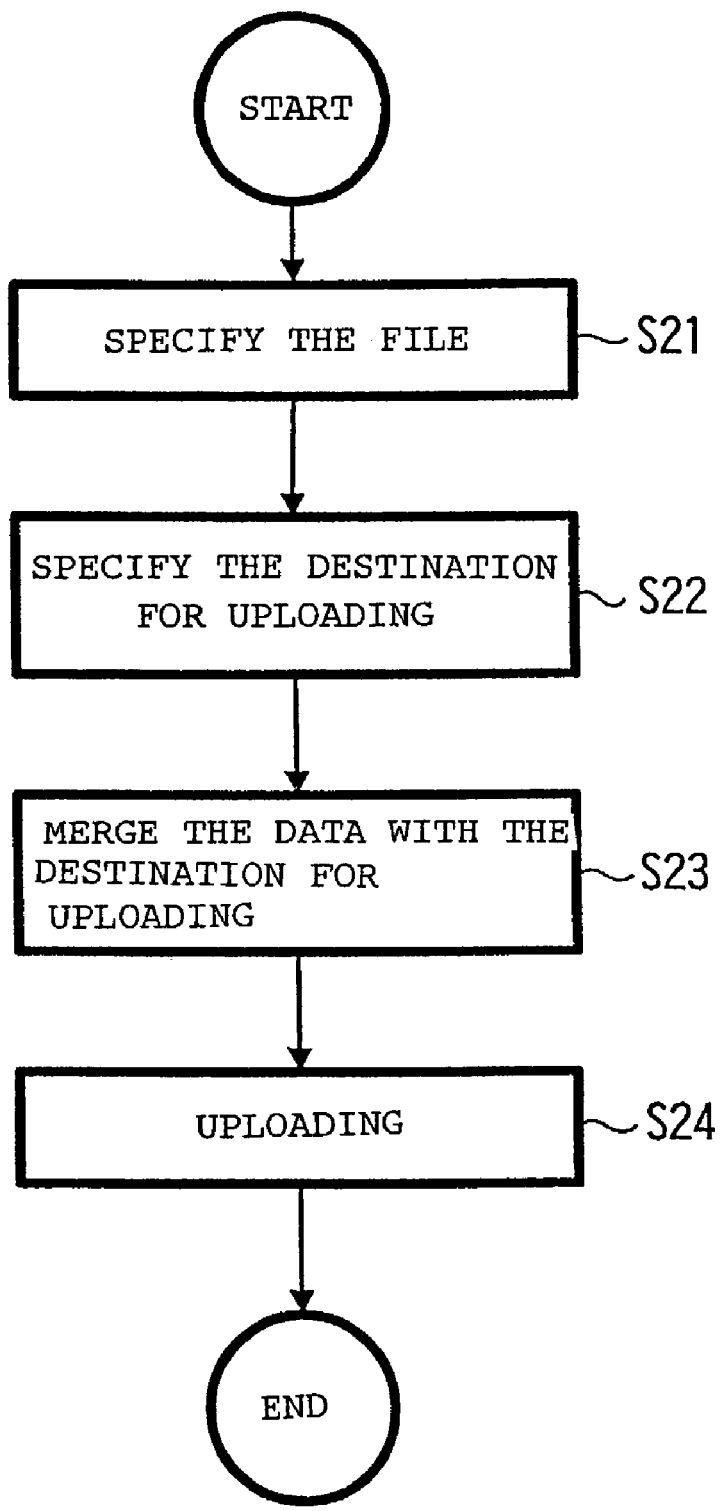
FIG. 8 is a flow chart for explaining the present invention.

As shown in FIG. 8, the dedicated uploading program makes the client (user) specify a data file that is to be uploaded (step S21). Then, the client (user) is made to input position information on a destination for uploading (step S22). Then, the above data and the position information on destination for uploading are united together to form a file (step S23). The data are then uploaded onto the predetermined intermediate server 4 (step S24).

Figure 9:
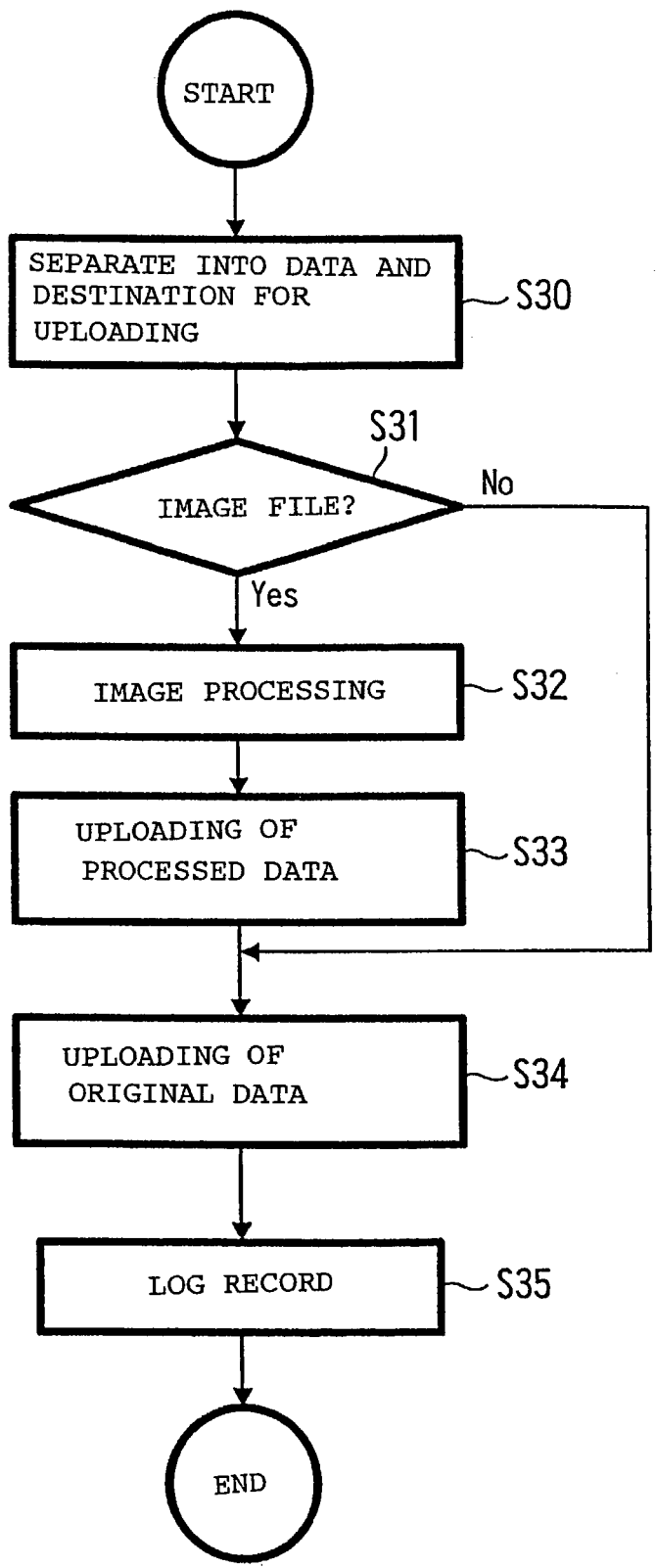
FIG. 9 is a flow chart for explaining the present invention.

The operation of the intermediate server 4 will now be described in further detail with reference to a flow chart of FIG. 9. In the intermediate server 4, the management program is operating at all times and executes the following processing for the uploaded data when the file transfer program has received the data uploaded by the dedicated uploading program of the client (user).

First of all, a file in which the data are united with the destination for uploading, is separated into the data and the position information on the destination for uploading (step S30). Next, it is decided whether the data are image data (step S31). When the data are image data (image file), the image processing program is activated to execute the processing for correcting the quality of the image data, thereby causing the processed data to be produced (step S32).

By using the file transfer program, the processed image data are uploaded to the destination for uploading of the server 1 of the provider specified by the client (user)(step S33). When the data are not image data (data file), the data are directly uploaded to the destination for uploading without executing the processing for correcting the image quality. Further, the original image data are uploaded when a subdirectory of the directory at the destination for uploading of the server 1 of the provider specified by the client (user) is used as a directory for preserving the original data (step S34). The record of operation of the system is preserved as log data (step S35).

The dedicated uploading program need not necessarily have unite the image data and the position information on the destination of uploading into one file. If so, the intermediate server 4 can receive the data separately.

The order of processing is not limited to the one described above. The order may be changed, or the processings need not be successively executed but may be executed in parallel without departing from the scope of intention described above.

To simplify the description in the foregoing, the image quality correction was performed for all image data. However, the object of image quality correction may be limited to each of the clients (users), each of the directories, etc. In this case, it is specified in advance not to correct the image quality by using the dedicated uploading program, or a step is provided for specifying the object at the time of uploading, and this information, is simultaneously uploaded to the intermediate server 4. The management program discriminates this information and can perform no correction for those objects that are not to be corrected.

The intermediate server 4 and the server 1 of the provider manage the accounting of the clients (users) in response to the request of log-in from the personal computers 2a, 2b, 2c, - - - of the clients (users), and execute the charging for the request from the clients (users).

As shown in FIG. 7, the configuration on the side of the intermediate server 4 is such that charging information management portion is put on a processing block different from the service area of the client (user) to handle the charging information. Specifically, the intermediate server 4 includes a first block 1A comprising an interface front end 4d connected to the personal computers 2a, 2b, 2c, - - - of the clients (users), and the server 1 of the provider, and image processing units 4a, 4b, 4c and a second block 4B comprising a management and charging management portion. The first block 4A and the second block 4B operate while authenticating each other through an interface 4e.

The second block 4B comprising the management and charging management portion includes a central processing unit (CPU) 4f, a work RAM 4g and a memory 4h. Reference numerals 4i and 4j denote bus lines.

The charging management is executed for such processings as image processing, inspection of image information and uploading of image data.

This embodiment is configured as described above, so that, when the client (user) unloads the image data to the server 1 of the provider, he specifies an arbitrary position on the server 1 of the provider using the dedicated uploading program of the personal computer 2a, 2b, 2c, - - - , to instruct on the uploading of the image data.

However, the dedicated uploading program unloads the image data not to the server 1 specified by the client (user) but onto the predetermined intermediate server 4. The intermediate server 4 corrects the quality of the image data that are received, and unloads the processed image data onto the server 1 of the provider initially specified by the client (user). The server 1 of the provider receives the image data uploaded from the intermediate server 4.

As the result on this, the image data whose quality is corrected are automatically uploaded to the position on the server 1 of the provider specified by the client (user). When the client (user) or a third party inspects the image data by using the browser and the like, he will see the image data that have been corrected for their quality.

According to this embodiment, therefore, the client (user) can obtain image data that have been corrected for their quality on the web page of the server 1 without using a particular hardware (electronic still camera) equipped with a function for correcting the image quality, without the need of purchasing and using an expensive software for correcting the image quality, but by simply uploading the image data prepared by the client (user) onto the server 1 of the provider without caring about anything as in the case of conventional he shoots silver salt photographs.

Further, the client (user) need only care about uploading the image data to the server 1 using the dedicated uploading program and need not care about where and how the picture quality is corrected. Thus, client (user) feels no bother concerning the correction of image quality.

A method of storing/reproducing data and a system for batch processing of the data according to an embodiment of the present invention will be described below with reference to the drawings.

FIG. 2 illustrates the whole configuration of the system used in the method of storing/reproducing image data according to the embodiment, in which reference numeral 1 denotes a server of the provider, and reference numerals 2a, 2b, 2c, - - - denote computers of the clients (users) that request service to the server 1, receive service from the server 1, and are connected to the server 1 through a communication circuit 3.

The number of the personal computers 2a, 2b, 2c, - - - of the clients as viewed from the side of the server 1 is an arbitrary number set by the memory and the operational capability of the central processing unit (CPU) on the side of the server 1.

Figure 10:
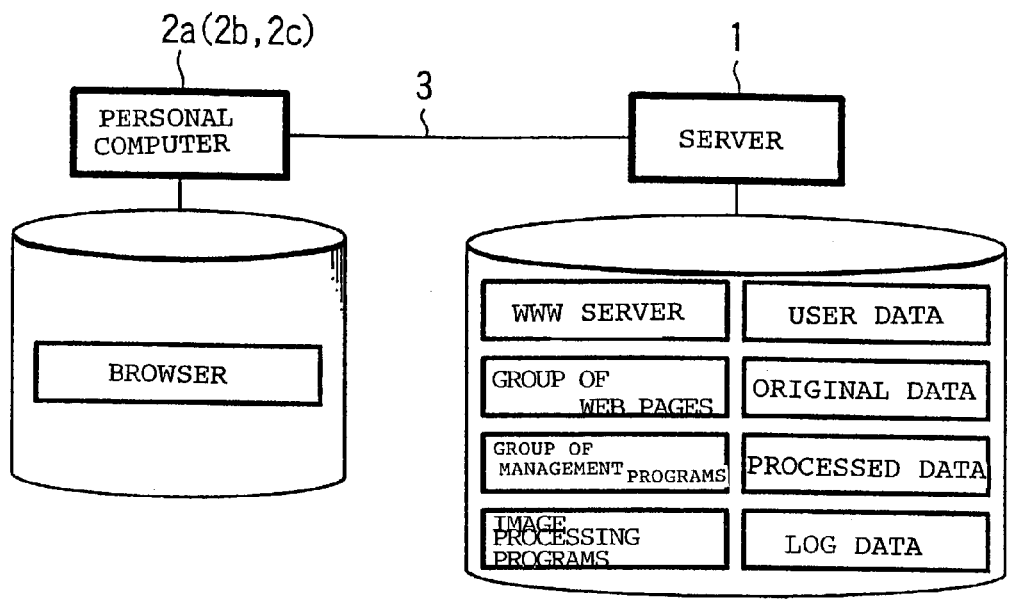
FIG. 10 is a structure diagram illustrating an embodiment of the method of storing/reproducing data according to the present invention.
Figure 11:
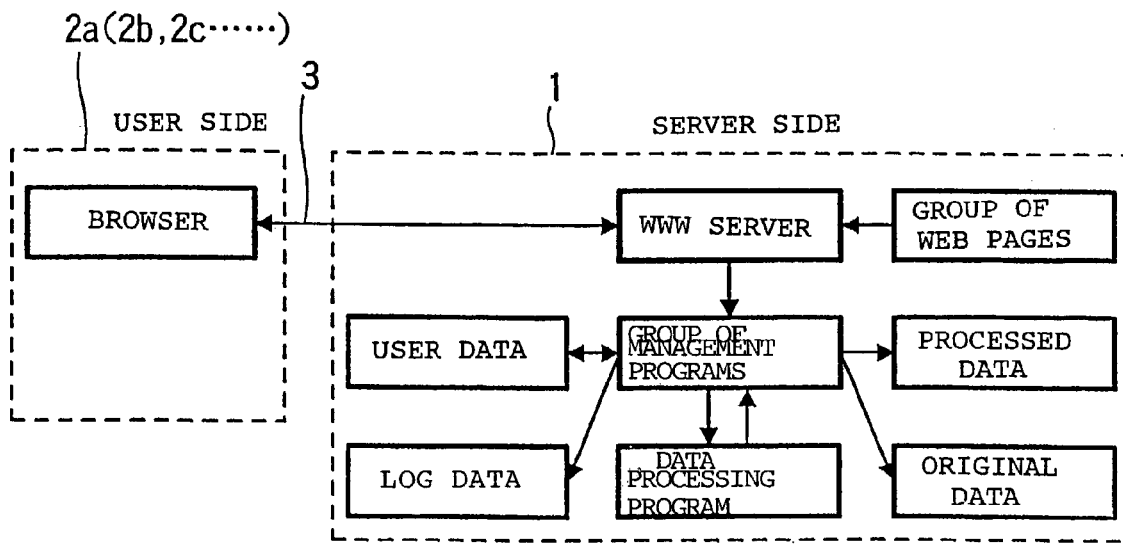
FIG. 11 is a functional block diagram illustrating the embodiment of the method of storing/reproducing data according to the present invention.

The computers 2a, 2b, 2c, - - - possessed by the clients are personal computers and the like. The personal computers 2a, 2b, 2c, - - - are each provided with at least a browser program as shown in FIGS. 10 and 11. The browser program is a web page inspection program such as Netscape Navigator or Microsoft Internet Explorer are now widely being used.

In such an example that the browser program is used by the personal computers 2a, 2b, 2c, - - - of the clients (users), a URL (uniform resource locator) of the server 1 of the provider is opened, and a picture corresponding to the description of a web page stored in the URL or is shown on a display screen connected to or integrated with the client's (user's) personal computers 2a, 2b, 2c, - - -.

The personal computers 2a, 2b, 2c, - - - of the clients (users) can arbitrarily activate the transfer program so that the image data may be uploaded onto the server 1 of the provider.

The server 1 stores at least an image processing program, a WWW (World Wide Web) server, a group of web pages, a group of management programs, user data, original image data, processed picture data and log data in a work station or the like as shown in FIG. 10 and FIG. 11.

The image processing program is the one for correcting the quality of a piece of picture of image data.

Examples of the WWW server include Apache, Netscape Server, Microsoft Internet Information Server and the like that are now widely being used.

The group of web pages is a collection of various files described in html (hyper text markup language) and files of figures or images inserted therein.

Figure 12:
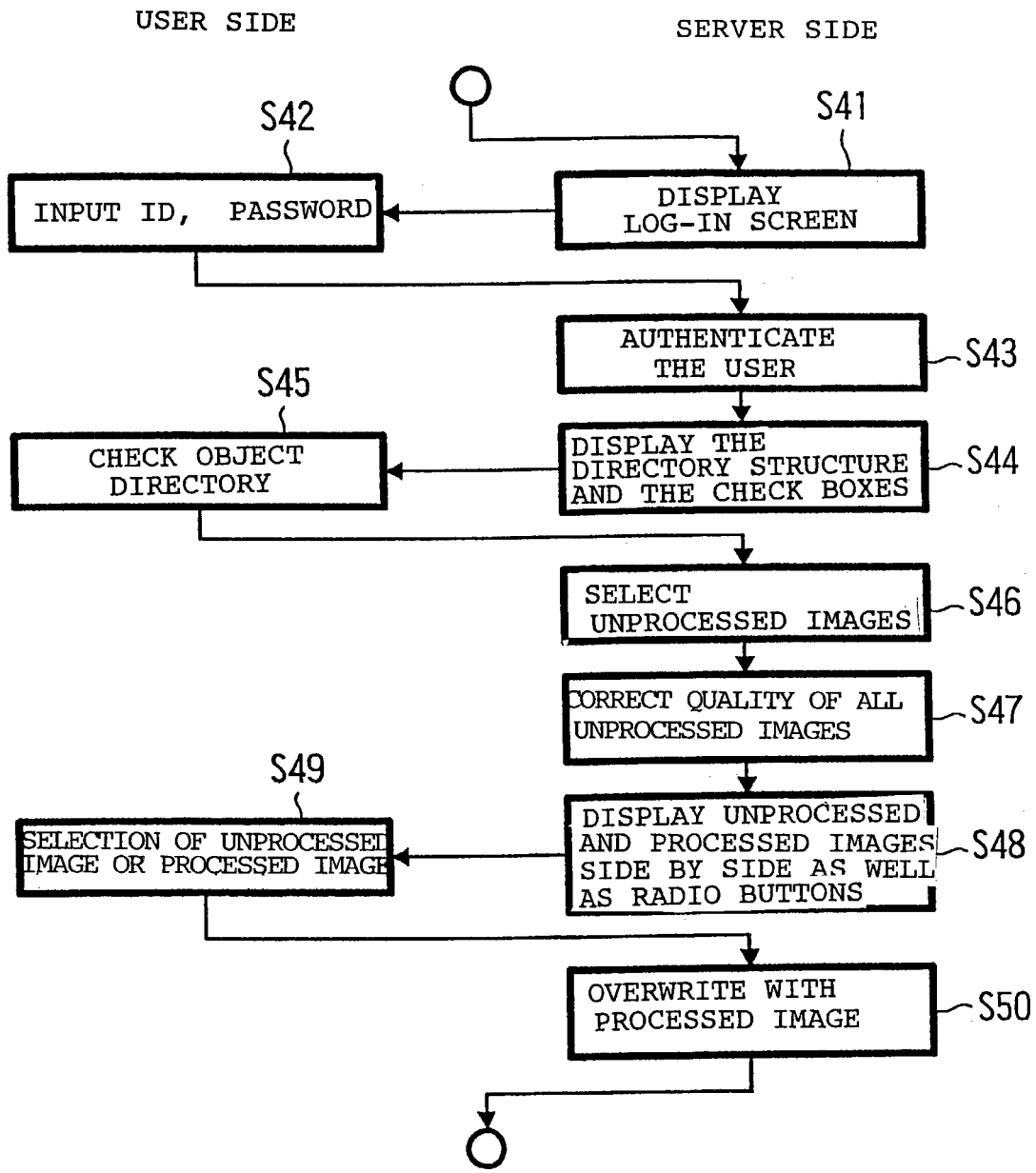
FIG. 12 is a flow chart for explaining the present invention.

The group of management programs is a group of programs for controlling the execution for correcting the quality of image data according to a flow shown in FIG. 12 that will be described later.

The user data include at least data for grasping the users who have accounts in the server 1, data possessed by the individual users, and data for grasping whether the image files have already been corrected for their quality.

The original image data are those that have already been uploaded from the user but not corrected for their quality.

The processed image data are those that have been corrected for their image quality, and the log data are records of execution for correcting the quality of image data.

The data uploaded from the side of the personal computers 2a, 2b, 2c, - - - of the clients (users) include image data as well as auxiliary data related to the image data. The auxiliary data are information on the image data or inherent information assigned to, for example, an electronic still camera that has prepared the image data. When the inherent information is attached to the image data that are uploaded, the image processing program on the side of the server 1 of the provider executes an optimum image processing based on the inherent information.

When the browser software operating on the personal computers 2a, 2b, 2c, - - - of the clients reads out the inherent information stored in the server 1 of the provider, displays them as a menu on the client's (user's) display screen, and selects the name of the electronic still camera used by the client (user), then, the inherent information corresponding to the electronic still camera can be selected.

Using upon the transfer program stored in the personal computers 2a, 2b, 2c, - - - and the program for transferring the inherent information data the transfer program selects the name of the electronic still camera used by the client (user) on the display screens of the personal computers 2a, 2b, 2c, - - - of the clients (users) as the browser software does, and thus selects the inherent information. This transfer program allows the inherent information to be transferred together with the image data.

In contrast to the case of using the inherent information, when the image processing program operating on the side of the server 1 has an optimizing routine for processing the image data, the inherent information need not be transferred.

The image data thus uploaded are processed by the image processing program optimized using the inherent information or the image processing as the processed data optimizing routine, and are stored in the server 1.

The communication circuit 3 may be a public telephone circuit, a dedicated circuit or an internet connecting the personal computers 2a, 2b, 2c, - - - of the users to the server 1 of the provider.

Next, steps of correcting the quality of image data using the group of management programs of the server 1 will be described with reference to using a flow chart of FIG. 12.

Figure 13:
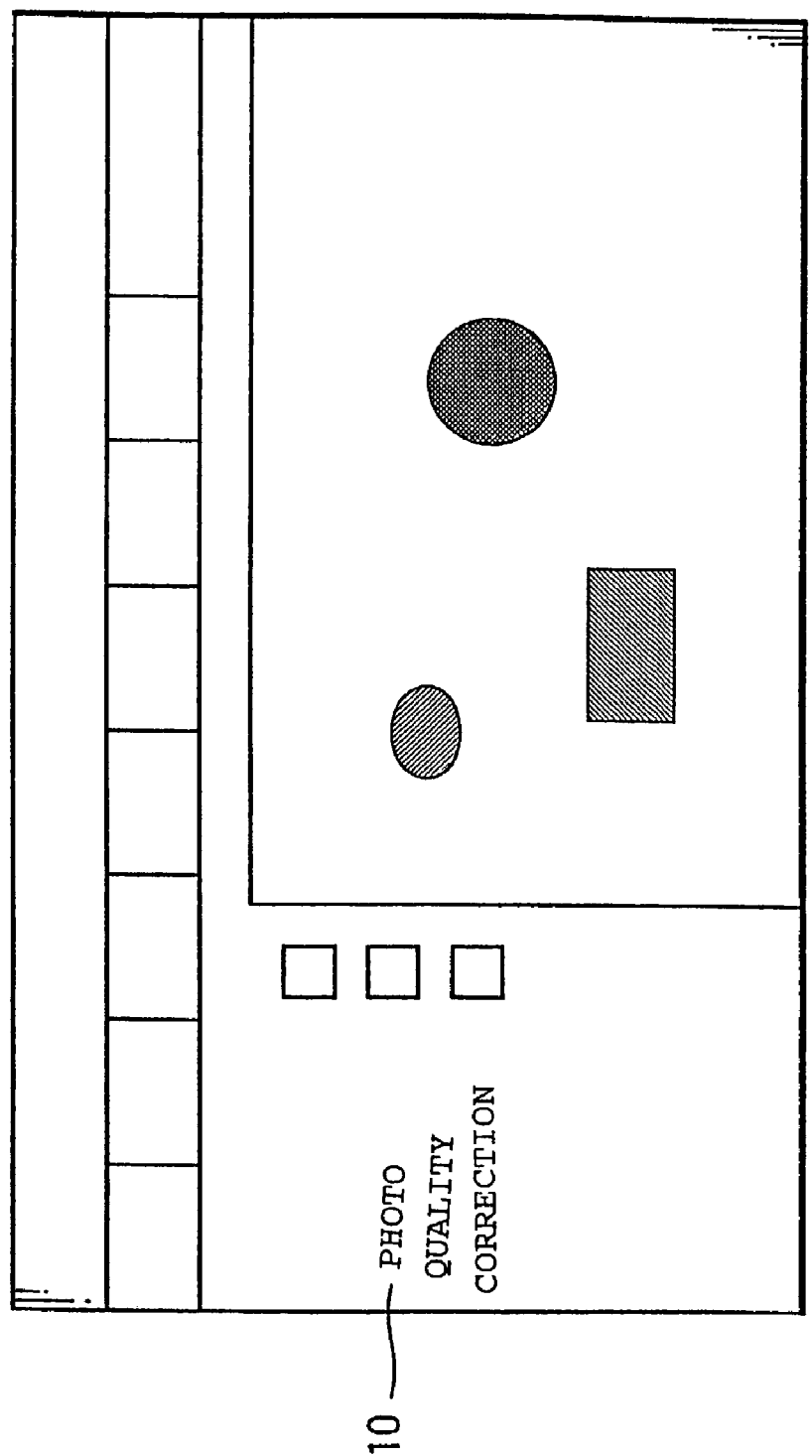
FIG. 13 is a diagram for explaining the present invention.

For example, a button 10 indicating "PHOTO QUALITY CORRECTION" and the like are provided on, e.g. a home page of the server 1 of the provider as shown in FIG. 13 as one of the web pages. The user clicks the button 10 on the browser through the communication circuit 3 such as internet to initiate the processing for correcting the image quality.

Upon receipt of instructions about a page for initiating the quality correction from the personal computers 2a, 2b, 2c, - - - of the users through the communication circuit 3, the WWW server in the server 1 of the provider causes the user browser to display a log-in page may skippingly be displayed which is one of the web pages (step S41). That is, the "PHOTO QUALITY CORRECTION" button 10 as shown in FIG. 13 is linked to the log-in page so that may skippingly be displayed the log-in page as soon as the "PHOTO QUALITY CORRECTION" button 10 is clicked.

Figure 14:
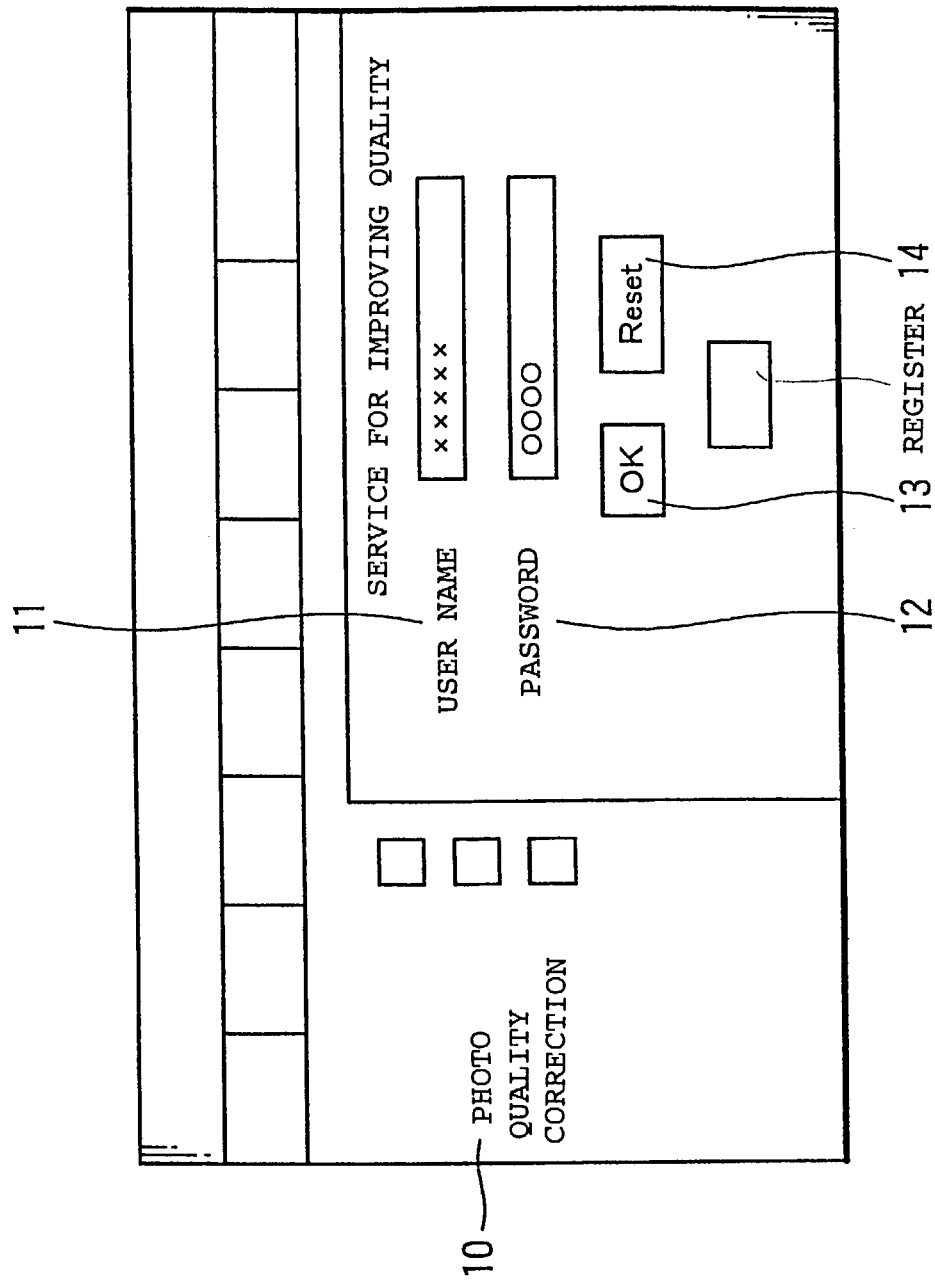
FIG. 14 is a diagram for explaining the present invention.

Referring to FIG. 14, the log-in page includes a transmission button 13, a reset button 14, and two text input fields, i.e., a user ID 11 and a password 12. They are realized by a form function. The user inputs the user ID and the password to the log-in page (step S42) and depresses (clicks) the transmission button 13. Then, the browser transmits the data to the WWW server.

Upon receipt of this data, the WWW server activates a first management program which is a CGI (Common Gateway Interface) program. The first management program authenticates the user (step S43), refers to user data when succeeding in the authentication, and holds the structure the home directory of the user and the following. The first management program, then, makes the user browser display the tree structure the home directory of the user and the following (step S44).

Figure 15:
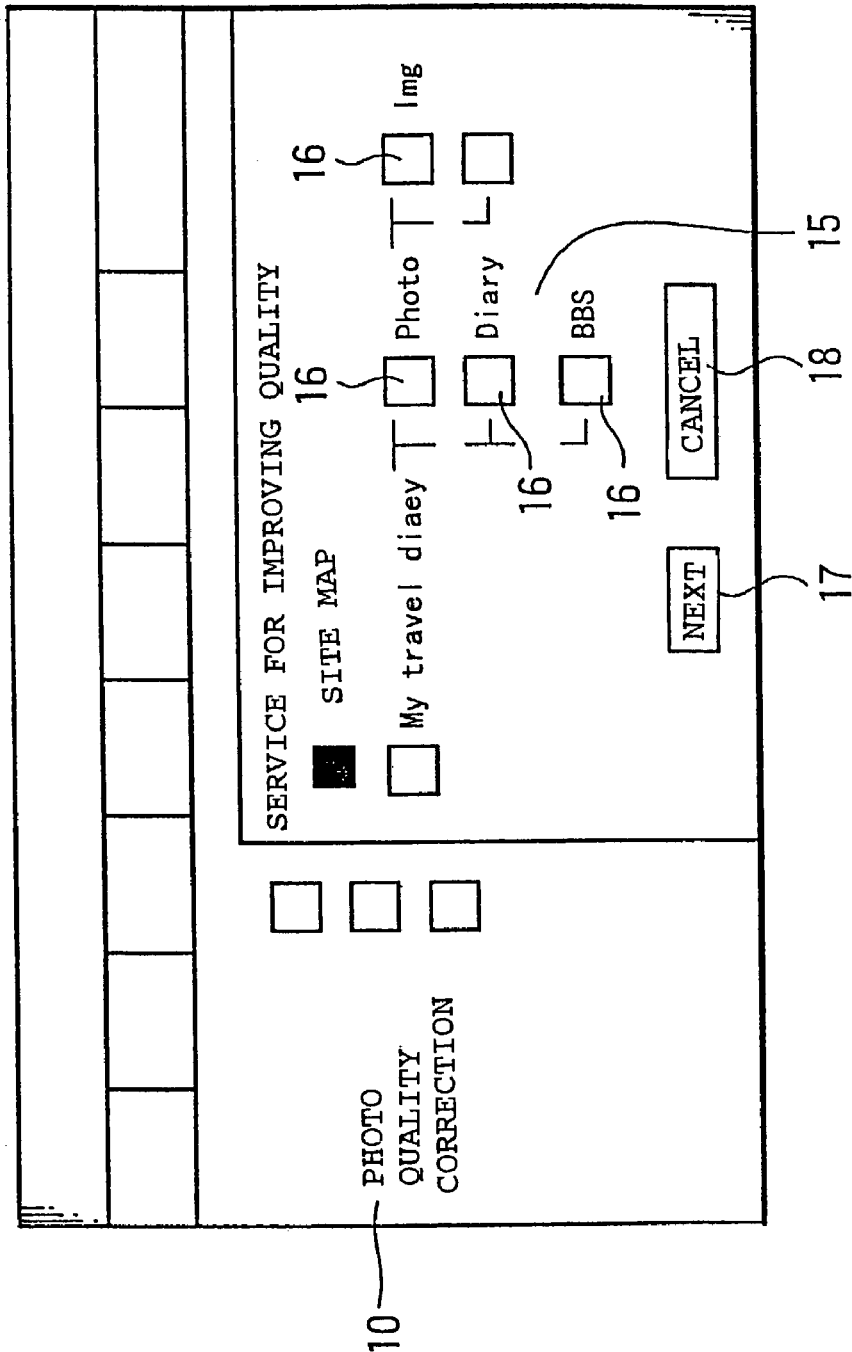
FIG. 15 is a diagram for explaining the present invention.

In this connection, as shown in FIG. 15, there are further displayed check boxes 16, together with the directory names 15 a transmission button 17 and a reset button 18. These check boxes 16, transmission button 17 and reset button 18 are also realized by the form function. However, the tree structure displayed by the first management program need not necessarily be a tree structure of directories, but may, for example, be a site map of a logical structure.

The user selects, out of the tree structure, a directory of which he wishes to correct the image quality this time, clicks a corresponding check box 16 to enter a check mark (step S45) and, then, clicks the transmission button 17 to transmit the data.

The WWW server receives the data and activates a second management program which is a CGI program. The second management program refers to the user data, and picks up those which have not yet been corrected for their quality out of the image file in the directory that is selected (step S46). Specifically speaking, a text file is put on each directory for example. This text file is hereinafter referred to as a first text file. Referring to FIG. 16, the first text file, then contains an arrangement of rows, each row being a pair of a file name and the time of processing (date and time).

The second management program compares the image file which is now existing in the directory with each of the rows in the first text file, and pick up those files of which the names have been written in the first text file. If the file name has been written in the first text file, then the second management program, compares the time when the next file is prepared with the time of processing written in the first text file. If the time of preparing the file is later than the time of processing, the file is picked up. Otherwise, the file is not picked up.

Figure 17:
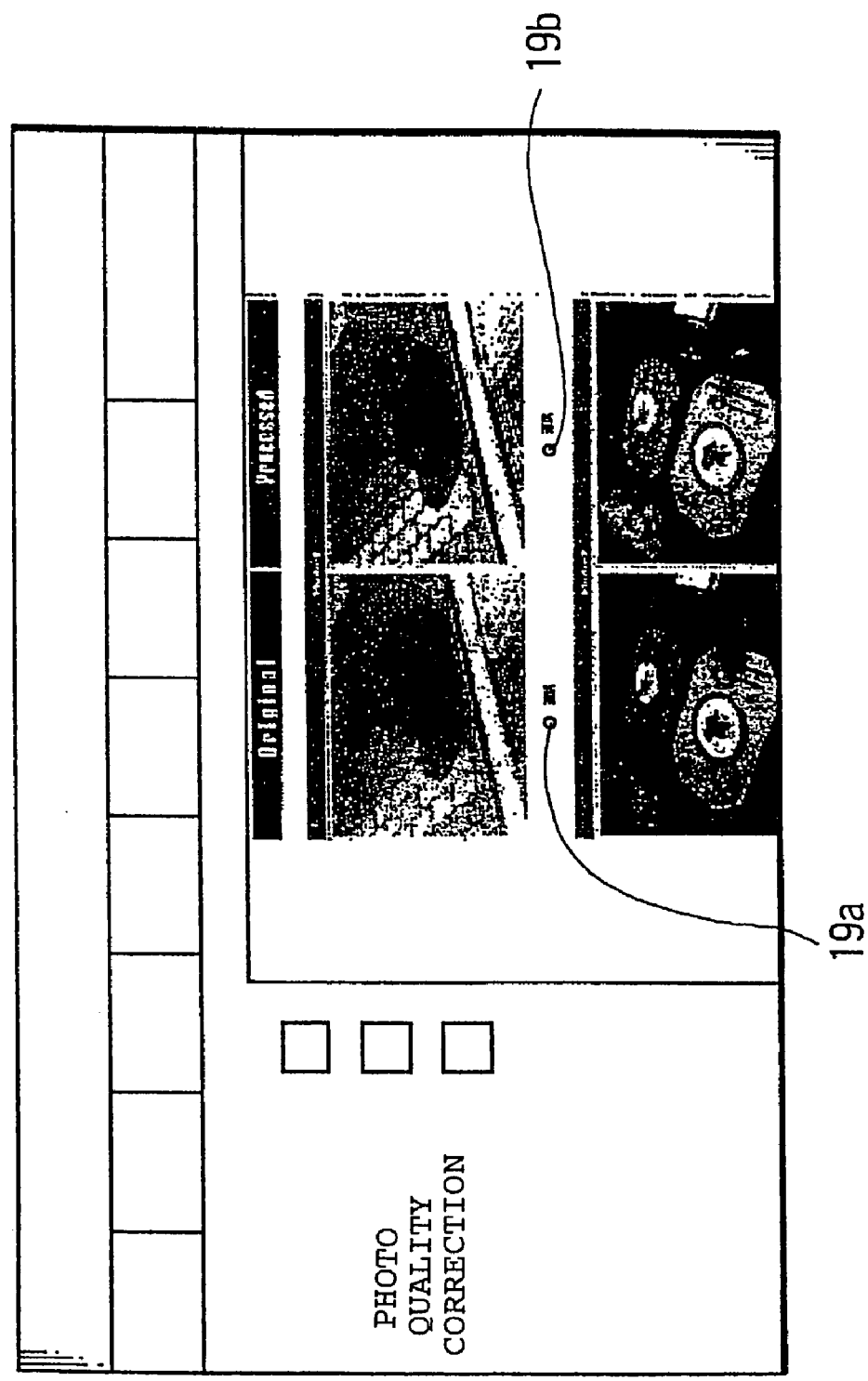
FIG. 17 is a diagram for explaining the present invention.
Figure 18:
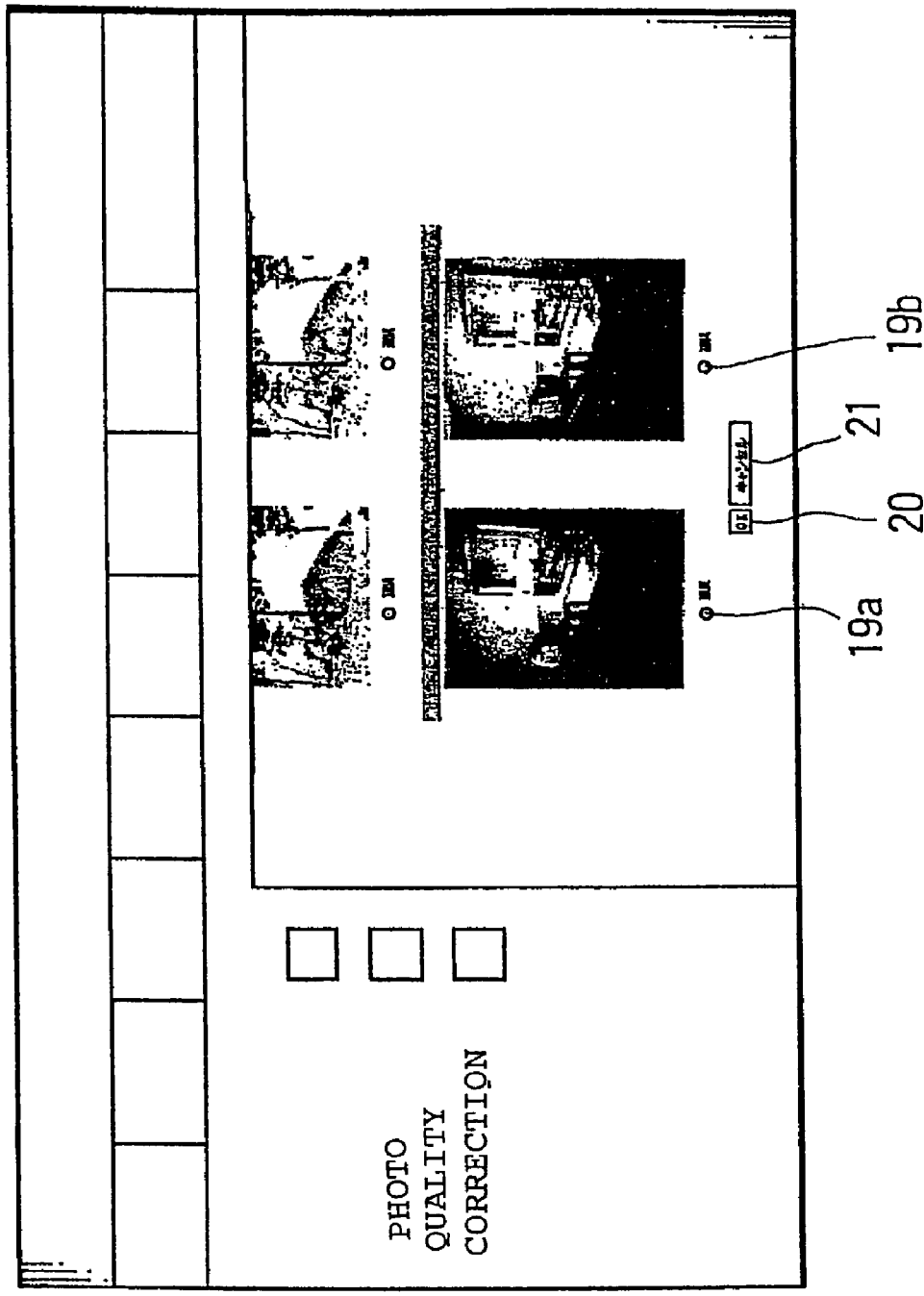
FIG. 18 is a diagram for explaining the present invention.

The second management program executes the processing of correcting the image quality by activating the image processing program, for all files that are picked up (step S47), stores the processed results in a file which is temporarily named, and causes the user browser to display the images before being processed and after being processed side by side as shown in FIGS. 17 and 18 (step S48).

In this case as shown in FIGS. 17 and 18, there are displayed radio buttons 19a, 19b, a transmission button 20 and a reset button 21 together with the images before and after being processed. The user clicks the radio button 19a or 19b to select either the image before being processed or the image after being processed (step S49). The radio buttons 19a, 19b, transmission button 20 and reset button 21 are also realized by the form function.

The selection means that, when the data are to be displayed hereinafter on the web page possessed by the user, it is selected whether the data before being processed are intactly displayed or the data of after being processed are displayed. The user conducts the selection for all pairs of images and clicks the transmission button 20 to transmit the selected data.

The WWW server receives the information data selected by the user and activates a third management program which is a CGI program. The third management program refers to the data selected by the user, and overwrites the image file before being processed, if the processed image is selected with, the processed image data, i.e., the image data that have been stored under a temporary file name (step S50).

Further, it is recorded in the user data that the file has already been processed. In the above-mentioned method of realization, for example, the first text file for each of the directories is referred to. When the name of the image file has already been written in the first text file, this row is erased, and a pair of the name of the image file and the present time is added as a row. The third management program erases the file having the temporary name formed by the second management program.

In this embodiment, further, the third management program counts the number of times that the overwriting is performed, records this in the user data, and executes the charging depending upon the number of times.

Not being limited to the above-mentioned operation, the third management program can perform other operations. For example, when the user does not wish to destroy the original image file before being processed, another directory, e.g., a directory for preserving the original data is prepared under the present directory, and the original image file is preserved therein. Thereafter, the data after being processed may be stored in the initial directory by the same name as that of the image file before being processed.

Alternatively, it is also permitted to store the data after being processed by the name different from that of the original file before being processed, and rewrite a portion where the image data before being processed described in an html file possessed by the user are referred to so as to refer to the image data after being processed.

Each management program writes the results of execution into the log file for every execution of processing at each of the steps.

The processing is thus finished and the log-in session described above come to an end. At this point, if the overwriting has been made at least once with the above-mentioned data that have been processed, the third management program records the number of times of the session in the user data, and executes the charging depending upon the number of times. For the user's convenience, on this occasion, the third management program may make the screen jump to the user's home page.

In this embodiment, the image data uploaded (stored) in the web page (storage medium) of the web server 1 are selected and are corrected for their quality (data conversion). Therefore, the client (user) can obtain image data that have been corrected for their quality the web server 1 without using a particular hardware equipped with a function for correcting the image quality, without the need of purchasing and using a software, without caring about the version-up, but by simply uploading the image data prepared by the user himself to the server 1 and selecting a file for which he wishes to correct the quality of image.

In the above-mentioned embodiment, the data to be processed (converted) are image data. The present invention, however, is not limited to image data only but can deal with, for example, voice data. When the data to be processed are voice data, the image processing program need only be changed into a voice processing program, and the data are managed by the management program as a voice file instead of the image file in quite the same manner.

Further, the sentence correction such as spell checking and style checking with respect to the html file can similarly be conducted only by changing the image processing program into a spell check program or style check program, and by charging the data managed by the management program from the image file to an html file. The layout in the html file can similarly be corrected automatically.

In the foregoing description, further, the image quality is corrected under the control of the second management program in order to simplify the description. When the amount of operating the image quality correction program is so large that an extended period of processing time is required, however, the processing is executed only for the thumbnail image that is necessary for being selected by the user for the time being, and only the image data really selected by the user for image processing may subsequently be corrected for their quality, as will be described with reference to FIGS. 19, 20, 21 and 22.

Figure 19:
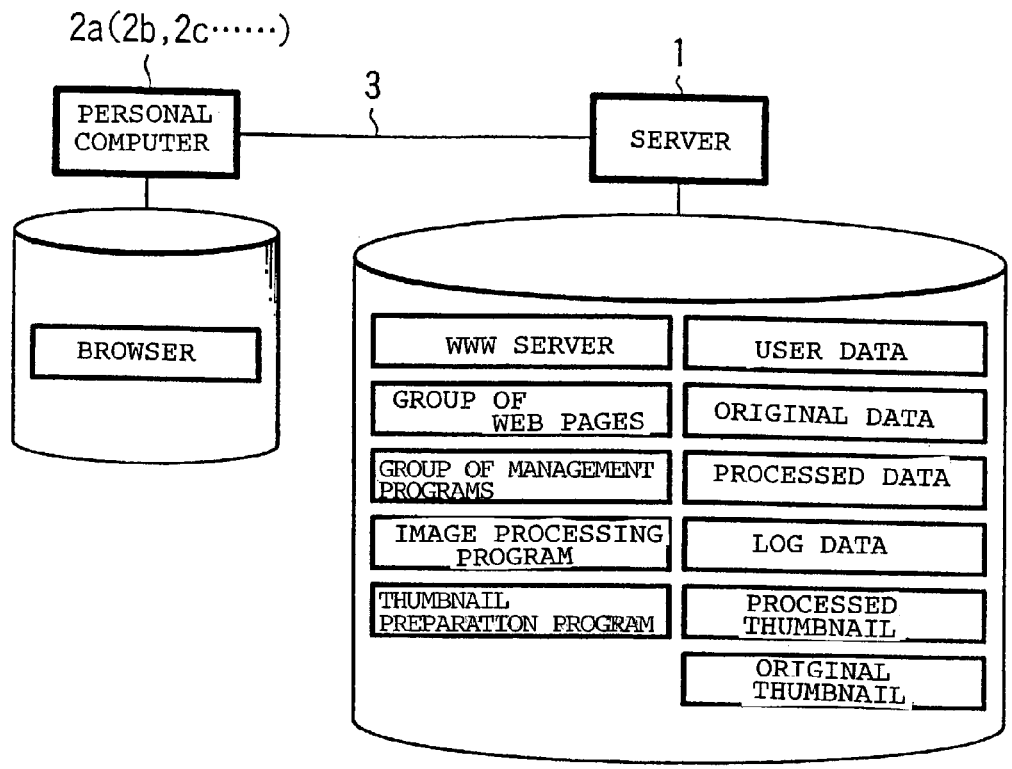
FIG. 19 is a structure diagram illustrating another embodiment of the method of storing/reproducing data according to the present invention.
Figure 20:
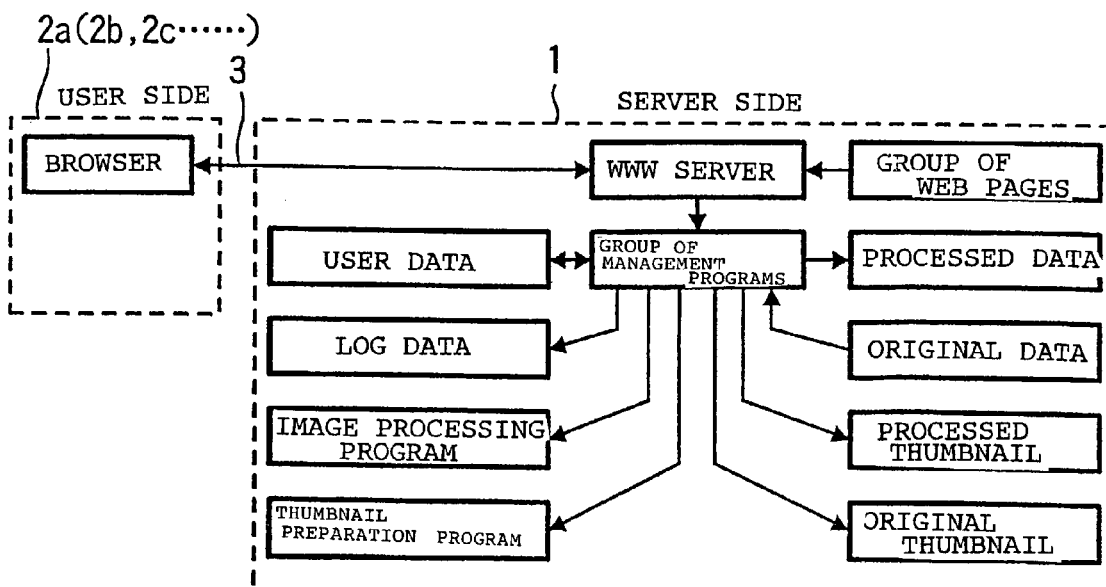
FIG. 20 is a functional block diagram illustrating the another embodiment of the method of storing/reproducing data according to the present invention.

FIGS. 19 and 20 are a structure diagram and a functional diagram corresponding to FIGS. 10 and 11. Similarly, the uploaded image data are stored in the server as thumbnail image data and the processed thumbnail image data made by a thumbnail preparation program and an image processing program.

Figure 21:
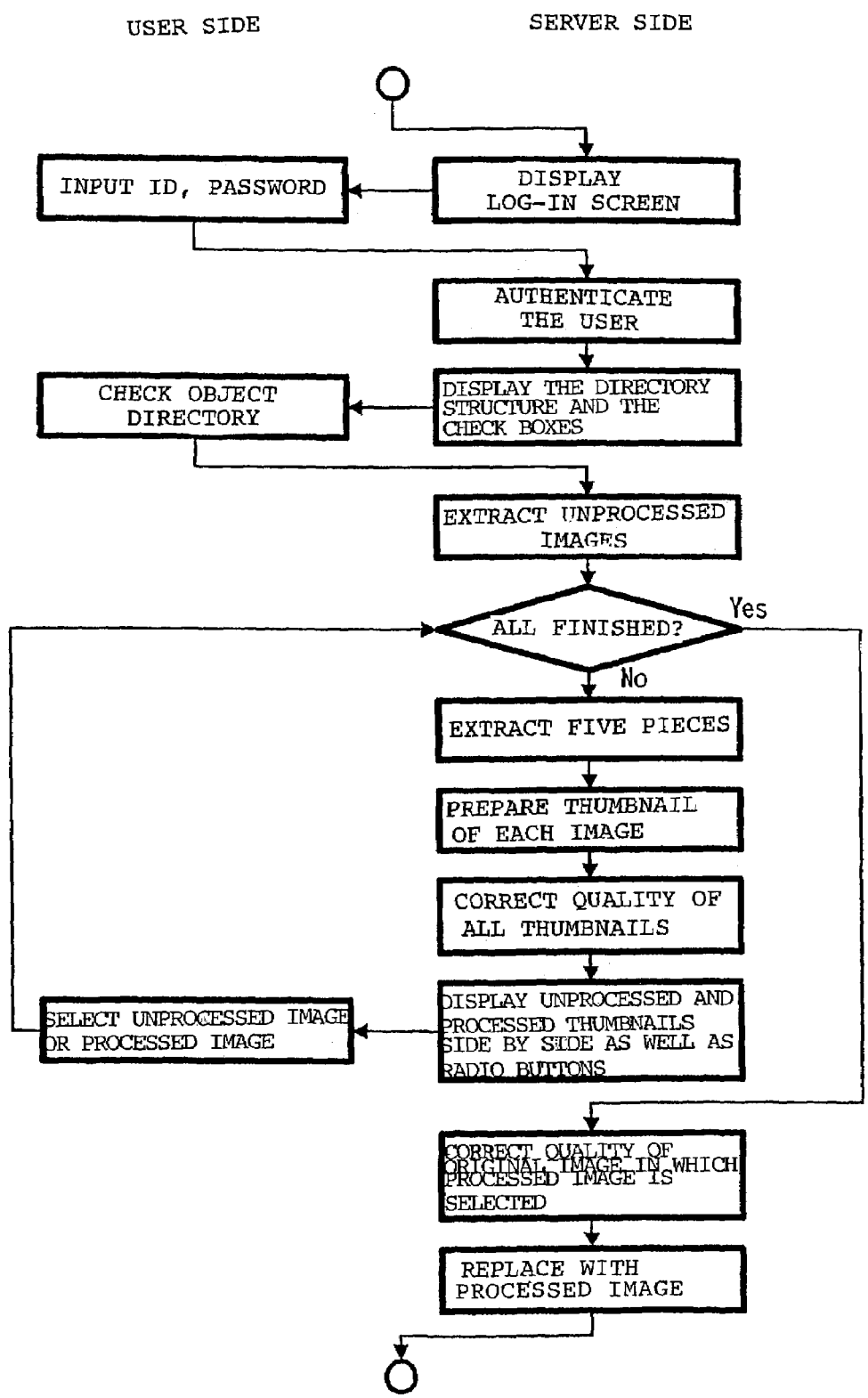
FIG. 21 is a flow chart for explaining the present invention.

Referring to FIGS. 21 and 22, after the user has logged in and is authenticated, a directory in which the uploaded image is recorded is displayed, and unprocessed images are extracted from the storage area indicated by the corresponding directory based on directory instructions with which the user wishes to process the image.

In FIG. 21, every five pieces of unprocessed images are selected to display, thumbnail images comprising processed images and the corresponding unprocessed images. The user is requested to select any one image and then the next five pieces of unprocessed images that are selected are displayed.

After all images are selected, only the original image corresponding to the selected thumbnail image is processed for their quality and the processed image data are substituted for the unprocessed image data.

In FIG. 22, unlike the processing for every plurality of images shown in FIG. 21, the selection is made for each image data of five pieces of images. The image is processed after the selection and is substituted for the unprocessed image data that are stored.

In FIGS. 21 and 22, each image thumbnailed is the one obtained by thinning out pixels from the original image. Therefore, the arithmetic unit (CPU) bears a reduced load of image processing, which offers an advantage that the user needs to wait for a reduced period of time.

To simplify the description in the above embodiment, the first management program displays the directory structure only. In this connection, there may further be displayed a list of image files existing in each directory and check boxes for each image file to make the user select any image file for which he wishes to execute the processing.

The data processing program described above may have a plurality of processing methods. In this case, there may be selected one of the data before being processed, the data after being processed by the first processing method, or the data after being processed by the second processing method, instead of the alternative method shown in FIGS. 17 and 18.

Next, a method of processing data and a system for batch processing of data according to an embodiment of the present invention will be described below with reference to the drawings.

FIG. 2 illustrates the whole system for processing image data according to the embodiment, in which reference numeral 1 denotes a server of the provider on the network, and reference numerals 2a, 2b, 2c, - - - denote computers of the clients (users) that request service of the server 1, receive service from the server 1, and are connected to the server 1 through a communication circuit 3.

The number of the computers 2a, 2b, 2c, - - - of the clients as viewed from the side of the server 1 is an arbitrary number set by the memory and the capability of operation of the central processing unit (CPU) on the side of the server 1.

The computers 2a, 2b, 2c, - - - possessed by the clients (users) are personal computers. The personal computers 2a, 2b, 2c, - - - are each provided with at least a browser program as shown in FIGS. 10 and 11. The browser program is a web page inspection program such as Netscape Navigator or Microsoft Internet Explorer that is now widely used.

In such an example that the browser program is used by the personal computers 2a, 2b, 2c, - - - of the clients (users), a URL (Uniform Resource Locator) of the server 1 of the provider is opened, and a picture corresponding to the description of a web page stored in the URL is shown on a display screen connected to or integrated with the user's personal computers 2a, 2b, 2c, - - - .

The personal computers 2a, 2b, 2c, - - - of the clients (users) can arbitrarily activate the transfer program to upload the image data to the server 1 of the provider.

The server 1 stores at least an image processing program, a WWW (World Wide Web) server, a group of web pages, a group of management programs, user data, original image data, processed image data and log data at a work station or the like as shown in FIGS. 10 and 11.

The image processing program is the one for correcting the quality of a piece of picture of image data.

Examples of the WWW server include Apache, Netscape Server, Microsoft Internet Information Server and the like that are now widely used.

The group of web pages is a collection of various files described in html (hyper text markup language) and files of figures and images inserted therein.

The group of management programs is a group of programs for controlling the execution of correcting the quality of image data according to a flow shown in FIG. 12 that will be described later.

The user data include at least data for grasping the users who have accounts in the server 1, and data for grasping the data possessed by the individual user.

The original image data are those but not that have been uploaded already from the user but not corrected for their quality.

The processed image data are those that have been corrected for their image quality, and the log data are records of execution for correcting the quality of image data.

The data uploaded from the side of the personal computers 2a, 2b, 2c, - - - of the clients (users) include image data as well as auxiliary data related to the image data. The auxiliary data are information on the image data or inherent information assigned to, for example, an electronic still camera that has prepared the image data. When the inherent information is attached to the image data that are uploaded, the image processing program on the side of the server 1 of the provider executes an optimum image processing based on the inherent information.

When the browser software operating on the personal computers 2a, 2b, 2c, - - - of the clients reads out the inherent information stored in the server 1 of the provider, displays them as a menu on the client's (user's) display screen, and selects the name of the electronic still camera used by the client (user), then, the inherent information corresponding to the electronic still camera can be selected.

Using the transfer program stored in the personal computers 2a, 2b, 2c, - - - and the program for transferring the inherent information data, the transfer program selects the name of the electronic still camera used by the client (user) on the display screens of the personal computers 2a, 2b, 2c, - - - of the clients (users) as the browser software does, and thus selects the inherent information. This transfer program allows the inherent information to be transferred together with the image data.

In contrast to the case of using the inherent information when the image processing program operating on the side of the server 1 has an optimizing routine for processing the image data, the inherent information need not be transferred.

The image data thus uploaded are processed by the image processing program optimized using the inherent information or the image processing optimizing routine, and are stored in the server 1 as the processed data.

The communication circuit 3 may be a public telephone circuit, a dedicated circuit or an internet connecting the personal computers 2a, 2b, 2c, - - - of the users to the server 1 of the provider.

In this embodiment, the processing record information indicating that the image quality has been corrected are inserted in the header of the data file during the processing for correcting the image quality. Therefore, the processing record information is written in the header of the processed image file.

Specifically, the header in this embodiment has the structure as shown in FIG. 23. The header structure of FIG. 23 is the one in which the processing record information like those shown in FIG. 24 are inserted in a comment area of the header of an ordinary image file. Many image file formats have an area for comment. The display of image is not affected no matter what data are inserted in the area. Therefore, the display is not at all affected even if the processing record information is inserted as shown in FIG. 23, and compatibility with the prior art is maintained.

The processing record information comprise, as shown in FIG. 24, kinds of image quality correction processings such as information on color correction and contrast correction, parameter values used for each of the corrections, date of processing, and the subject that has processed, e.g., server name.

Next, steps of correcting the quality of image data by a group of management programs of the server 1 will be described with reference to a flow chart of FIG. 12.

For example, a button 10 indicating "PHOTO QUALITY CORRECTION" and the like are provided on, e.g. a home page of the server 1 of the provider as shown in FIG. 13 as one of the web pages. The user clicks the button 13 on the browser through the communication circuit 3 such as internet to initiate the processing for correcting the image quality.

Upon receipt of an instructions about initiating the quality correction from the personal computers 2a, 2b, 2c, - - - of the users through the communication circuit 3, the WWW server in the server 1 of the provider causes the user browser to display a log-in page which is one of the web pages (step S41). That is, the "PHOTO QUALITY CORRECTION" button 10 as shown in FIG. 13 is linked to the log-in page so that may skippingly be displayed the log-in page as soon as the "PHOTO QUALITY CORRECTION" button 10 is clicked.

Referring to FIG. 14, the log-in page includes a transmission button 13, a reset button 14, and two text input fields, i.e., a user ID 11 and a password 12. They are realized by a form function. The user inputs the user ID and the password to the log-in page (step S42) and depresses (clicks) the transmission button 13. Then, the browser transmits the data to the WWW server.

Upon receipt of this data, the WWW server activates a first management program which is a CGI (Common Gateway Interface) program. The first management program authenticates the user (step S43), refers to the user data when succeeding in the authentication, and holds the structure of the home directory of the user and the following. The first management program, then, makes the user browser display the tree structure of the home directory of the user and the following(step S44).

In this connection, as shown in FIG. 15, there are further displayed check boxes 16 together with the directory names 15, a transmission button 17 and a reset button 18. These check boxes 16, transmission button 17 and reset button 18 are also realized by the form function. However, the tree structure displayed by the first management program need not necessarily be a tree structure of directories, but may, for example, be a site map of a logical structure.

The user selects, out of the tree structure, a directory of which he wishes to correct the image quality this time, clicks a corresponding check box 16 to enter a check mark (step S45) and then clicks the transmission button 17 to transmit the data.

The WWW server receives the data and activates a second management program which is a CGI program. The second management program refers to the processing record information in the header concerning each of the image files. When it is learned from the processing record information that the image quality has already been corrected, the relevant image file is then not processed this time. When it is learned from the processing record information that the image quality has not yet been corrected, the relevant image file is then processed. In this way, there are picked up those files which have not been corrected for their quality out of the image files in the directory that is selected (step S46).

Specifically, the second management program sees the headers of the image files. When it is a bitmap file shown in FIG. 23, ten bytes are skipped from the head of the file, the next 4 bytes indicating the size of the file header being read out, the size of the INFO header being read out and, at the same time, this number of bytes minus 4 bytes being skipped so that the INFO header may also be skipped.

Then, a portion from the next byte up to the header size learned above is read out, and character string matching is performed among them. When it is decided by the matching that the data are the processing record information (e.g., a character string "PQE—Contrast" as shown in FIG. 24) representing the kind of the image quality correction processing predetermined, there are information on the kind of processing, parameter, date of processing and processing subject out of a portion to the end point (e.g., semicolon ";" shown in FIG. 24) of the character string of the processing record information, and are grasped by the second management program.

This processing is further continued while other processings are executed. That processing record information is also read out as well if it is recorded, and it is grasped. This is done for each of the files.

In this way, whether the image quality correction which is now to be performed, has already been executed can be learned for each of the files. Hence, the files which have not yet been corrected for their image quality can be picked up.

By activating the image processing program, the second management program executes the processing of correcting the image quality and the processing of writing into the header for all files that are picked up (step S47), stores the processed results in a file which is temporarily named, and causes the user browser to display the images before being processed and after being processed side by side as shown in FIGS. 17 and 18 (step S48).

Here, the processing of writing into the header is to write the above-mentioned processing record information shown in FIG. 24 into the comment area of the header shown in FIG. 23. Specifically, the size of the header and the size of the INFO header are read out, and the kind of the processing, parameter value, date of processing and information on the subject having processed are written into text into a portion right after the INFO header. It is rewritten to be increased by the number of bytes of the text into which the header size is written.

In this case, as shown in FIGS. 17 and 18, there are displayed radio buttons 19a, 19b, a transmission button 20 and a reset button 21 together with the images before being processed and after being processed. The user clicks the radio button 19a or 19b to select either the image before being processed or the image after being processed (step S49). The radio buttons 19a, 19b, transmission button 20 and reset button 21 are also realized by the form function.

The selection means that when the data are to be displayed hereinafter on the web page possessed by the user, it is selected whether the data before being processed are intactly displayed or the data after being processed are displayed. The user conducts the selection for all pairs of images and clicks the transmission button 20 to transmit the selected data.

The WWW server receives the data selected by the user and activates a third management program which is a CGI program. The third management program refers to the information data selected by the user, and overwrites the image file before selected, with the processed image data, i.e., the image data that have been stored under a temporary file name (step S50). The third management program erases the file having the temporary name produced by the second management program.

In this embodiment, further, the third management program counts the number of times that the overwriting is performed, records this in the user data, and executes the charging depending upon the number of times.

Not being limited to the above-mentioned operation, however, the third management program can perform other operations. For example, when the user does not wish to destroy the original image file before being processed, another directory is, e.g., a directory for preserving the original data is prepared under the present directory, and the original image file is preserved therein. Thereafter, the data of after being processed may be preserved in the initial directory using the same name as that of the image file of before being processed.

Alternatively, it is also permitted to store the data after being processed by the name different from that of the original file of before being processed, and rewrite a portion where reference is made to the image data before being processed described in an html file possessed by the user are referred to so as to refer to the image data after being processed.

Each management program writes the results of execution into the log file for every execution of processing at each of the steps.

The processing is thus finished and the log-in session described above come to an end. At this point, if the overwriting has been made at least once with the above-mentioned data that have been processed, the third management program records the number of times of the session in the user data, and executes the charging depending upon the number of times. For the user's convenience, on this occasion, the third management program may make the screen jump onto the user's home page.

According to this embodiment, the processing record information indicating that the image data have been corrected for their quality is written into the header which is a portion that is managed integrally with the image data. Accordingly, it is easy to manage whether the image data are processed, for example, corrected for their quality. Even when it is not desired to repeat the same data processing such as the processing of correcting the quality of image data twice or more, it is allowed to change the file name of the image data or to change the preserving put without any problem.

In the above-mentioned embodiment, the data take the form of a file managed in the file system, and the processing record information is written in the form of a text into the comment portion in the header. The present invention, however, is not limited thereto only but can be constructed in a variety of ways. First of all, the data need not be written in the form of a text. In particular, parameter values may be binary values so as to be managed in quite the same simple way, whereby saving the size of the file can also be saved.

Further, a unique file system may be prepared to be treated in the same manner as the file property information, such as the last updated date and the name of the file owner managed integrally with the file. Moreover, the data may be those which are managed in the data base system, and the data body and the processing record information may be made into a single structure for management.

In the above embodiment, the CGI program has been cited as a an example of an example of a method of realizing the batch processing, but the invention is not limited thereto. Further, the present invention may be applied not only to the batch processing for the data already preserved on the server that was described in the above embodiment, but also to a system which executes the correction processing on the server after the data have been uploaded to the server from the computer of the user (client).

In this case, the same processing is not repeated twice or more even when the processing record information is written into only those data that have been processed among the uploaded data, followed by the execution of the above-mentioned batch processing.

In the above-mentioned embodiment, the data to be processed are image data. The present invention, however, is not limited to image data only but can deal with, for example, voice data. When the data to be processed are voice data, the image processing program need only be changed into a voice processing program, and the data are managed by the management program as a voice file, thereby allowing the processing to be performed instead of the image file in quite the same manner.

Further, the sentence correction such as spell checking and style checking with respect to the html file can similarly be conducted only by changing the image processing program into a spell check program or style check program, and by changing the data managed by the management program from the image file to an html file. The layout in the html file can similarly be corrected automatically.

In the foregoing description, the image quality is corrected under the control of the second management program in order to simplify the description. When the operational amount of the image quality correction program is so large that an extended period of processing time is required, however, the processing is executed only for the thumbnail image that is necessary for being selected by the user for the time being, and the image data really selected by the user for being processed only may be subsequently corrected for their quality as will be described with reference to FIGS. 19, 20, 21 and 22.

FIGS. 19 and 20 are a structure diagram and a functional diagram corresponding to FIGS. 10 and 11. Similarly, the uploaded image data are stored in the server as thumbnail image data and as the processed thumbnail image data made by a thumbnail preparation program and an image processing program.

Referring to FIGS. 21 and 22, after the user has logged in and is authenticated, a directory in which the uploaded image is recorded is displayed, and unprocessed images are extracted from the storage area indicated by the corresponding directory based on a directory instructions with which the user wishes to process the image.

In FIG. 21, every five pieces of unprocessed images are selected to display thumbnail images comprising processed images and the corresponding unprocessed images. The user is requested to select any one image and then the next five pieces of unprocessed images that are selected are displayed.

After all images are selected, only the original image corresponding to the selected thumbnail image is processed for their quality and the processed image data are substituted for the unprocessed image data.

In FIG. 22, unlike the processing for every plurality of images shown in FIG. 21, the selection is made for each image data of five pieces of images. The image is processed after the selection and is substituted for the unprocessed image data that are stored.

In FIGS. 21 and 22, each image thumbnailed is the one obtained by thinning out pixels from the original image. Therefore, the arithmetic unit (CPU) bears a reduced load of image processing, which offers an advantage in that the user needs to wait for a reduced period of time.

To simplify the description in the above embodiment, the first management program displays the directory structure only. In this connection, there may further be displayed a list of image files existing in each directory and check boxes for each image file to make the user select any image file for which he wishes to execute the processing.

The data processing program described above may have a plurality of processing methods. In this case, there may be selected one of the data before being processed, the data after being processed by the first processing method, or the data after being processed by the second processing method, instead of the alternative method shown in FIGS. 17 and 18.

The invention claimed is:

1. An apparatus for processing image data that are uploaded to a server of a provider from a personal computer of a client, comprising:

image data acquisition means for acquiring image data and corresponding auxiliary data into the server; wherein the image data was captured by an imaging apparatus and transferred to the personal computer and the auxiliary data comprises imaging conditions information corresponding to the imaging apparatus;

first storage means for storing the acquired image data and corresponding auxiliary data;

image quality correction means for correcting an image quality of the acquired image data stored in the first storage means based on the imaging conditions information corresponding to the imaging apparatus; wherein the correcting process includes at least one of a color correction and a contrast correction on the image data;

second storage means for storing the corrected image data using an identifier; and management means for managing the correcting process performed by the image quality correction means, wherein the management means manages the correcting process on the acquired image data stored in the first storage means (i) at predetermined intervals, or (ii) when the acquired image data are newly acquired by the acquisition means;

wherein the management means includes deciding means for deciding whether the image quality of the acquired image data stored in the first storage means has been previously corrected; and third storage means for storing the acquired image data stored in the first storage means, wherein the acquired image data stored in the first storage means is stored in the third storage means if the decision by the deciding means is that the acquired image data stored in the first storage means has not been previously corrected.

2. The apparatus for processing image data according to claim 1, further comprising charging means for charging a fee to the client.

3. The apparatus of claim 1, wherein the acquired image data stored in the first storage means is stored in the third storage means if the decision by the deciding means is that the acquired image data stored in the first storage means has not been previously corrected by the management means.

* * * * *